(12) United States Patent
Yamazaki et al.

(10) Patent No.: US 6,678,023 B1
(45) Date of Patent: Jan. 13, 2004

(54) LIQUID CRYSTAL PROJECTOR

(75) Inventors: Shunpei Yamazaki, Tokyo (JP);
Yoshiharu Hirakata, Kanagawa (JP);
Takeshi Nishi, Kanagawa (JP);
Shunichi Naka, Osaka (JP); Shuhei Tuchimoto, Nara (JP); Hiroshi Hamada, Nara (JP); Yoshihiro Mizuguchi, Nara (JP)

(73) Assignees: Semiconductor Energy Laboratory Co., Ltd., Kanagawa-ken (JP); Sharp Kabushiki Kaisha, Osaka (JP)

(*) Notice: Subject to any disclaimer, the term of this patent is extended or adjusted under 35 U.S.C. 154(b) by 389 days.

(21) Appl. No.: 09/631,825

(22) Filed: Aug. 3, 2000

Related U.S. Application Data

(62) Division of application No. 09/210,777, filed on Dec. 15, 1998, now Pat. No. 6,144,426.

(30) Foreign Application Priority Data

Dec. 17, 1997 (JP) .............................................. 9-363992

(51) Int. Cl.⁷ .................................................. G02F 1/13
(52) U.S. Cl. .................................. 349/95; 349/62; 349/7
(58) Field of Search ................................. 349/62, 95, 5, 349/6, 7

(56) References Cited

U.S. PATENT DOCUMENTS

| | | |
|---|---|---|
| 4,686,519 A | 8/1987 | Yoshida et al. |
| 5,097,323 A | 3/1992 | Sato et al. |
| 5,161,042 A | 11/1992 | Hamada |
| 5,231,432 A | 7/1993 | Glenn |
| 5,321,448 A | 6/1994 | Ogawa |
| 5,418,586 A | 5/1995 | Fujimori et al. |
| 5,488,436 A | 1/1996 | Choi et al. |
| 5,548,349 A * | 8/1996 | Mizuguchi et al. ......... 348/766 |
| 5,565,933 A | 10/1996 | Reinsch |
| 5,623,348 A * | 4/1997 | Ogino .......................... 349/5 |
| 5,633,737 A | 5/1997 | Tanaka et al. |
| 5,643,826 A | 7/1997 | Ohtani et al. |

(List continued on next page.)

FOREIGN PATENT DOCUMENTS

| | | |
|---|---|---|
| EP | 573 925 A1 | 12/1993 |
| JP | 61-64158 | 4/1986 |
| JP | 3-248125 | 11/1991 |
| JP | 7-130652 | 5/1995 |
| JP | 7-135318 | 5/1995 |
| JP | 7-181487 | 7/1995 |
| JP | 8-78329 | 3/1996 |

OTHER PUBLICATIONS

M. Oikawa and K. Iga, "Distributed–Index Planar Microlens," Applied Optics, vol. 21, No. 6, Mar. 15, 1982, pp. 1052–1056.

(List continued on next page.)

*Primary Examiner*—James Dudek
(74) *Attorney, Agent, or Firm*—Eric J. Robinson; Robinson Intellectual Property Law Office, P.C.

(57) ABSTRACT

A liquid crystal projector in which light is effectively used and an excellent picture can be obtained is provided. In the liquid crystal projector, dichroic mirrors arranged at different angles are used to separate white light into beams of light of three primary colors of R, G, and B, and the respective beams of light are incident on microlenses at different angles. The respective beams of light of the three primary colors are distributed by the microlenses to optical components corresponding to pixels, and highly collimated light beams can be obtained by the optical components. Since the highly collimated light beams are made incident on the pixels of the liquid crystal panel, the beams can be certainly made incident on desired pixels.

32 Claims, 16 Drawing Sheets

U.S. PATENT DOCUMENTS

| | | |
|---|---|---|
| 5,648,277 A | 7/1997 | Zhang et al. |
| 5,651,599 A | 7/1997 | Fujimori et al. |
| 5,731,857 A | 3/1998 | Neijzen |
| 5,801,795 A | 9/1998 | Ogino |
| 5,859,675 A | 1/1999 | Ogino |
| 5,990,992 A | 11/1999 | Hamanaka et al. |
| 6,141,124 A * | 10/2000 | Suzuki et al. .................. 359/15 |

OTHER PUBLICATIONS

"Electronics Letters" The Institution of Electrical Engineers, Jun. 25, 1981, vol. 17, No. 13, pp. 452–454.

Zoran D. Popovic et al., "Technique for Monolithic Fabrication of Microlens Arrays," Apr. 1, 1988, vol. 27, No. 7, Applied Optics, pp. 1281–1284.

H. Hamada et al., "P3.6–1 A New High Definition Microlens Array Built in p–Si TFT–LCD Panel," Liquid Crystal Labs., Sharp Corp., Tenri, Japan, ASIA DISPLAY '95, pp. 887–890.

* cited by examiner

CMOS CIRCUIT    PIXEL MATRIX CIRCUIT

LIQUID CRYSTAL PROJECTOR

This application is a Divisional of application Ser. No. 09/210,777 filed Dec. 15, 1998 now U.S. Pat. No. 6,144,426.

BACKGROUND OF THE INVENTION

1. Field of the Invention

The present invention relates to a projector using a liquid crystal display device. And also, the present invention relates to a liquid crystal projection TV incorporating the liquid crystal projector.

2. Description of the Related Art

In recent years, a technique for manufacturing a semiconductor device in which a semiconductor thin film is formed on an inexpensive glass substrate, such as a thin film transistor (TFT), has been rapidly developed. The reason is that the demand for an active matrix type liquid crystal display device (liquid crystal panel) has been increased.

The active matrix type liquid crystal panel is structured such that a TFT is disposed for each of several tens to several millions pixel regions disposed in matrix, and an electric charge going in and out of each pixel electrode is controlled by the switching function of the TFT.

Above all, a projection type display device using an active matrix type liquid crystal panel, a so-called projector has rapidly broadened the market. The reason is that the liquid crystal projector is superior in color reproducibility, is small, is lightweight, and has low power consumption, as compared with a projector using a CRT.

The liquid crystal projector is classified into a three-panel type and a single panel type by the number of active matrix type liquid crystal panels to be used.

FIG. 16 shows an example of a three-plate type liquid crystal projector. Reference numeral 1601 denotes a light source, 1602 and 1603 denote dichroic mirrors for selectively reflecting light in a wavelength region of R (red) and G (green), respectively. Reference numerals 1604, 1605, and 1606 denote total reflection mirrors, and 1607, 1608, and 1609 denote transmission type liquid crystal panels corresponding to R, G, and B. Reference numeral 1610 denotes a dichroic prism, and 1611 denotes a projection lens.

In the three-plate type liquid crystal projector, pictures corresponding to the three primary colors of red, green, and blue are displayed on the three black and white display liquid crystal panels 1607, 1608, and 1609, and the liquid crystal panels are illuminated with beams of light of the three primary colors corresponding to the pictures. The obtained pictures of the respective primary color components are synthesized by the dichroic prism 1610 and are projected on a screen. Thus, the three-plate type liquid crystal projector is superior in display properties (resolution, screen illumination, color purity). However, since the liquid crystal panels and optical parts (lenses, mirrors, and the like) for three systems are required, the optical system becomes complicated and miniaturization is difficult. Moreover, since the expensive dichroic prism is required, the cost becomes very high.

On the other hand, in the single plate type liquid crystal projector, by the same system as a conventional direct view type liquid crystal display device using a color filter, the obtained color picture is projected on a screen by a method of driving each of the R, G, and B pixels. FIG. 17 is a structural view showing a conventional single plate type projector. Reference numeral 1701 denotes a light source, 1702 denotes a condensing lens, 1703 denotes a liquid crystal panel, 1704 denotes a projection lens, and 1705 denotes a screen.

Since the number of optical parts of the single plate type liquid crystal projector is merely ⅓ of those of the foregoing three-plate type liquid crystal projector, the single type liquid crystal projector is superior in cost, size, and the like. However, in the case where the same liquid crystal panel is used for both the three-plate type and the conventional single plate type, while three colors are overlapped on one pixel in the three-plate type, one pixel can be used only as one color pixel in the single plate type, so that the picture quality of the single plate type is inferior to that of the three-plate type. Moreover, in the above single plate type liquid crystal projector, a desired color picture is obtained by making an unnecessary component absorbed by a color filter. Thus, only ⅓ of the white light incident on the liquid crystal panel transmits, so that use efficiency of light is poor.

Although a method of making a light source brighter has been adopted to improve the brightness of the above single plate type liquid crystal projector, there have occurred problems with respect to the heat generation due to light absorption of a color filter and its light resistance.

Then, for the purpose of overcoming the defects of the conventional single plate type liquid crystal projector, a liquid crystal projector using three dichroic mirrors and a microlens array has been devised.

Reference will be made to FIG. 18. FIG. 18 is a structural view showing an optical system of the above single plate type liquid crystal projector. Reference numeral 1801 denotes a white light source including a lamp and a reflector. Reference numerals 1802, 1803, and 1804 denote dichroic mirrors which reflect light in the wavelength regions of blue, red, or green, respectively. Reference numeral 1805 denotes a microlens array which is constituted by a plurality of microlenses. Reference numeral 1806 denotes a liquid crystal panel, which makes display in a TN (twisted nematic) mode. Incidentally, the liquid crystal panel 1806 operates in a normally white mode in which white display is made when a voltage is not applied. Reference numeral 1807 denotes a field lens, 1808 denotes a projection lens, and 1809 denotes a screen.

The light 1801 source emits the white light having a spectrum of red, green, and blue. The light source 1801 is set so that the parallelity of the emitted white light becomes high. The reflector is used to effectively use the white light emitted from the lamp.

The white light emitted from the light source 1801 is incident on the dichroic mirrors 1802, 1803, and 1804. These three dichroic mirrors are disposed at different angles so that the white light from the light source 1801 is separated into beams of light of three primary colors (red, green, and blue), and these three light beams are incident on the microlens array 1805 at different angles.

The dichroic mirror 1802 reflects only the ray of light in the blue wavelength region and transmits other beams of light. The dichroic mirror 1803 reflects only the ray of light in the red (R) wavelength region among the beams of light having passed through the dichroic mirror 1802, and transmits other beams of light. The dichroic mirror 1804 reflects the ray of light in the green wavelength region among the beams of light having passed through the dichroic mirrors 1802 and 1803. By adopting such a structure, it is possible to separate the white light emitted from the light source 1801 into three colors.

Reference will be made to FIG. 19. As shown in FIG. 19, one microlens corresponds to three pixels of the liquid crystal panel 1806 corresponding to the three primary colors of R, G, and B.

The microlens array 1805 distributes the above separated beams of light of the three primary colors to the corresponding pixels and condenses the beams.

Like this, in the single plate type liquid crystal projector having the above structure, after the white light is separated into beams of light of the three primary colors of R, G, and B, the respective beams of light are made incident on an opening portion of the corresponding pixel of the liquid crystal panel by the microlens, so that the light can be used at efficiency not less than three times the foregoing single plate type liquid crystal projector using the color filter.

However, in the liquid crystal projector using this microlens, the light flux condensed to the respective pixels by the microlens diverges in a large angle range after it has passed through the liquid crystal panel. Thus, unless a projection lens with a large aperture is used, the light flux can not be completely used, so that the screen illumination is lowered.

In the liquid crystal panel used in the liquid crystal projector using this microlens, a TN (twisted nematic) mode is adopted. Moreover, a normally white mode in which a white state is made when a voltage is not applied to a liquid crystal, is used. In the TN mode, although a higher contrast is obtained in the case where display at the liquid crystal panel is made in the normally white mode than the normally black mode (mode in which a black state is made when a voltage is not applied to a liquid crystal), if defects occur in a pixel portion TFT of the liquid crystal panel, they are apt to become bright point defects. In the case where a picture is enlarged and is displayed as in the projector, especially the foregoing pixel defects have a bad influence on the picture display.

SUMMARY OF THE INVENTION

An object of the present invention is to provide a liquid crystal panel to solve the foregoing problem, to provide a single plate type liquid crystal projector including the liquid crystal panel, and to provide a liquid crystal type projection TV including the liquid crystal projector.

According to an aspect of the present invention, a liquid crystal panel including optical means, said optical means being for irradiating each pixel opening portion of the liquid crystal panel with one of the plurality of color beams which incident upon the liquid crystal panel from different angle each other, wherein said optical means comprises: a first optical means for distributing and condensing the separated plurality of color beams with respect to each of the colors, said first optical means being arranged with a pitch of a plurality of pixels of the liquid crystal panel; a second optical means having a same pitch as the first optical means, said second optical means being for bending principal rays of the plurality of color beams which are distributed by the first optical means to make the beams incident on the liquid crystal panel from an optimum viewing angle direction; and a third optical means having a same pitch as the pixels of the liquid crystal panel, said third optical means being for parallelizing diverged beams being passed through the second optical means toward the pixel opening portions.

Each of the first, second, and third optical means includes a microlens array.

The second optical means includes a microlens array having a same pitch as the first optical means.

The second optical means includes an array of trapeziform prisms having the same pitch as the first optical means.

Each of the first optical means and the second optical means includes cylindrical lenses.

At least one of the first, second, and third optical means is formed in an incident side substrate of the liquid crystal panel.

The liquid crystal panel utilizes an electro-optical effect.

The liquid crystal panel utilizes an electric field control birefringence mode.

The liquid crystal panel is operated in a normally black mode.

Liquid crystal molecules of the liquid crystal panel are oriented substantially vertically to a substrate.

A liquid crystal projector comprising: a white color light source; a separation means for separating a white light from the white light source into a plurality of color beams; and the liquid crystal panel.

A liquid crystal projector comprising: a white color light source; three dichroic mirrors for separating a white light from the white light source into three color beams; the liquid crystal panel.

The plurality of color beams separated by the separation means are red, green and blue beams.

According to another aspect of the present invention, a liquid crystal projector comprises a white color light source; separation means for separating white light from the white light source into beams of light of a plurality of colors; a liquid crystal panel; optical means disposed at an incident side of the liquid crystal panel and for irradiating pixel opening portions of the liquid crystal panel with the plurality of color beams for color beams for each color; and means for projecting the beams of light of the plurality of colors modulated by the liquid crystal panel, the optical means comprising: first optical means for distributing and condensing the separated beams of light of the plurality of colors with respect to each of the colors, the first optical means being arranged with a pitch of a plurality of pixels of the liquid crystal panel; second optical means having the same pitch as the first optical means and for bending the principal rays of the beams of light of the plurality of colors distributed by the first optical means to make the beams incident on the liquid crystal panel from an optimum viewing angle direction; and third optical means having the same pitch as the pixels of the liquid crystal panel and for parallelizing the diverged beams of light having passed through the second optical means toward the pixel opening portions. The above object can be achieved by this structure.

The beams of light of the plurality of colors separated by the separation means may be beams of light of red, green and blue.

The first, second, and third optical means may include microlens arrays.

The second optical means may include the microlens array having the same pitch as the first optical means.

The first and second optical means may include cylindrical lenses.

The second optical means may include an array of trapeziform prisms having the same pitch as the first optical means.

At least one of the first, second, and third optical means may be formed in an incident side substrate of the liquid crystal panel.

The liquid crystal panel may be a liquid crystal panel using an electro-optical effect.

The liquid crystal panel may be a liquid crystal panel using an electric field control birefringence mode.

The liquid crystal panel may make display in a normally black mode.

Liquid crystal molecules of the liquid crystal panel may be oriented vertically or substantially vertically to the substrate.

According to another aspect of the present invention, a liquid crystal projector comprises a white color light source; three dichroic mirrors for separating white light from the white light source into beams of light of three colors; a liquid crystal panel; first optical means disposed at an incident side of the liquid crystal panel and for distributing and condensing the beams of light of the three colors with respect to each of the colors; a second optical means for bending the principal rays of the beams of light of the three colors and for making the beams incident on the liquid crystal panel from an optimum viewing angle direction; a third optical means for parallelizing the diverged beams of light having passed through the second optical means toward pixel opening portions; and means for projecting the beams of light of the three colors modulated by the liquid crystal panel, the liquid crystal panel using an electric field control birefringence mode among electro-optical effects of a liquid crystal. The above object can be achieved by this structure.

According to still another aspect of the present invention, a liquid crystal projector comprises a white color light source; three dichroic mirrors for separating white light from the white light source into beams of light of three colors; a liquid crystal panel; first optical means provided at an incident side of the liquid crystal panel and for distributing and condensing the beams of light of the three colors with respect to each of the colors; a second optical means for bending the principal rays of the beams of light of the three colors to make the beams incident on the liquid crystal panel from an optimum viewing angle direction; a third optical means for parallelizing the diverged beams of light having passed through the second optical means toward pixel opening portions; and means for projecting the beams of light of the three colors modulated by the liquid crystal panel, the liquid crystal panel using an electro-optical effect of a liquid crystal and the liquid crystal panel making display in a normally black mode. The above object can be achieved by this structure.

According to still another aspect of the present invention, a liquid crystal projector comprises a white color light source; three dichroic mirrors for separating white light from the white light source into beams of light of three colors; a liquid crystal panel; first optical means disposed at an incident side of the liquid crystal panel and for distributing and condensing the beams of light of the three colors with respect to each of the colors; second optical means for bending the principal rays of the beams of light of the three colors to make the beams incident on the liquid crystal panel from an optimum viewing angle direction; third optical means for parallelizing the diverged beams of light having passed through the second optical means toward pixel opening portions; and means for projecting the beams of light of the three colors modulated by the liquid crystal panel, the liquid crystal panel making display in a normally black mode. The above object can be achieved by this structure.

In the liquid crystal projector of the present invention, the beams of light of red, green, and blue separated by the dichroic mirrors are distributed, made parallel, and can be made incident on the corresponding pixels by the microlenses. By this, although the liquid crystal projector is a single plate type projector, the light from the light source can be effectively used, and a bright picture can be obtained. Moreover, since the divergence angle of the light having passed through the liquid crystal panel is suppressed, an F value (reciprocal of an aperture ratio) can be set to a value larger than a conventional value. Thus, since a projection lens having a small aperture can be used, miniaturization and low cost of the device becomes possible.

Moreover, the liquid crystal projector of the present invention uses the liquid crystal panel in which liquid crystal molecules are oriented vertically to the substrate, and display is made in the ECB (electric field control birefringence) mode. If the polarizing axes of polarizing plates disposed at the incident side and the emanating side of the liquid crystal panel are made to cross each other at right angles, the normally black mode in which black display is made when a voltage is not applied is obtained. In the normally black mode, even in the case where a defect occurs in a TFT of the liquid crystal panel, the pixel of the TFT in which the defect occurred makes black display, so that the pixel defect is hardly noticeable even if an image is enlarged on a screen. Thus, a superior picture can be obtained.

DETAILED DESCRIPTION OF THE PREFERRED EMBODIMENTS

Embodiment 1

This embodiment relates to a liquid crystal projector using microlens arrays. According to the liquid crystal projector of this embodiment, the beams of light of R, G, and B distributed by a microlens can be made incident respectively on opening portion of each corresponding pixel of a liquid crystal panel. Thus, the light from a light source can be effectively used, and a bright picture can be obtained on a screen.

Figure 1:
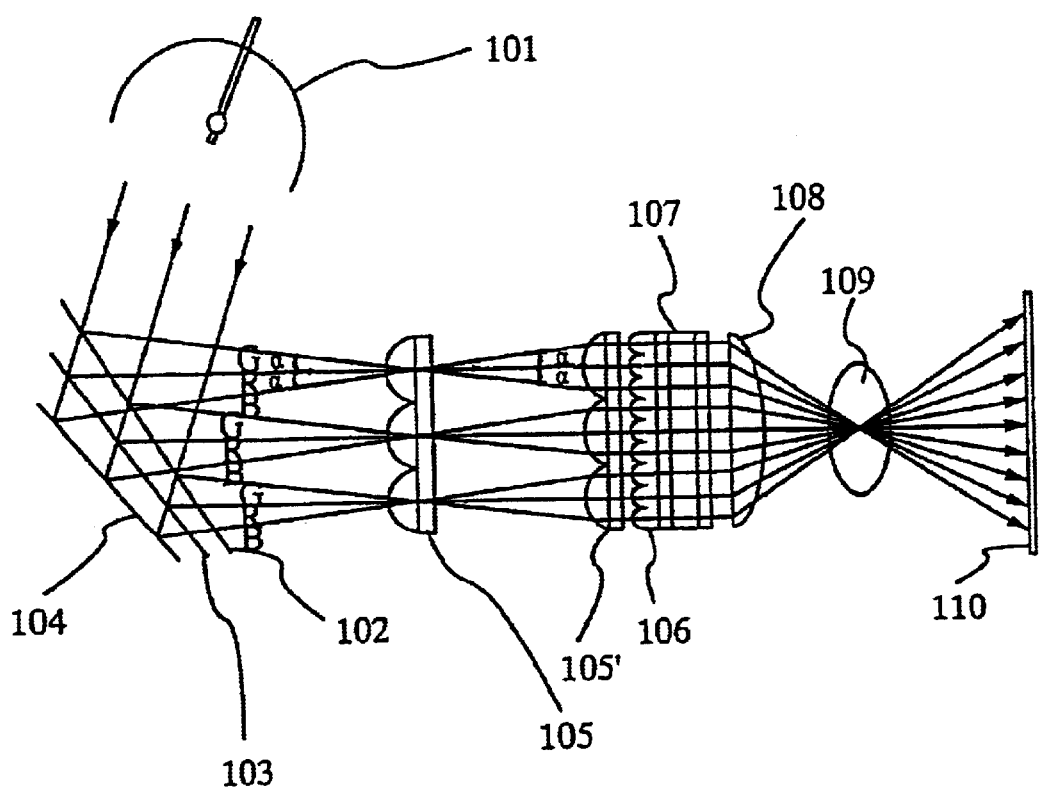
FIG. 1 is an optical system of a liquid crystal projector of Embodiment 1 of the present invention.

First, reference will be made to FIG. 1. Reference numeral 101 denotes a white light source including a lamp and a reflector, which is used as a light source means of this embodiment. As the lamp of the light source 101, a metal halide lamp is used. Reference numerals 102, 103, and 104 denotes dichroic mirrors, each of which reflects selectively a ray of light in a green, red, or blue wavelength region, and which is used as means for separating the white light. Reference numerals 105, 105', and 106 denote microlens arrays. Although the microlens arrays 105 and 105' do not have the same shape, the respective pitches of the arrays are equal to a distance of three pixels and are equal to each other. Reference numeral 107 denotes a liquid crystal panel, and this embodiment uses a panel in which liquid crystal molecules are oriented vertically to a substrate, and display is made in an ECB mode. Incidentally, in the liquid crystal panel 107, a normally black mode in which black display is made when a voltage is not applied, is adopted. Reference numeral 108 denotes a field lens, 109 denotes a projection lens, and 110 denotes a screen.

The white light having a spectrum of red, green, and blue is emitted from the light source 101. The light source 101 is set such that the parallelity of the emitted white light becomes high. The reflector is used to effectively use the white light emitted from the lamp. Incidentally, other optical elements may be used so that the parallelity of the white light emitted from the light source 101 becomes high.

The white light emitted from the light source 101 is incident on the dichroic mirrors 102, 103, and 104. These three dichroic mirrors separate the white light from the light source 101 into beams of light of the three primary colors (red, green, and blue), and are arranged at different angles so that the beams of light of these three colors are incident on the microlens array 105 at different angles, respectively. In this way, the white light emitted from the light source 101 is separated into the beams of light of a plurality of colors (in this embodiment, the beams of light of three colors).

The dichroic mirror 102 reflects only the beam of light in the green (G) wavelength region and transmits other beams of light. The dichroic mirror 103 reflects only the beam of light in the red (R) wavelength region among the beams of light having passed through the dichroic mirror 102 and transmits other beams of light. The dichroic mirror 104 reflects the beam of light in the blue (B) wavelength region among the beams of light having passed through the dichroic mirrors 102 and 103. By adopting such a structure, it is possible to separate the white light emitted from the light source 101 into the three primary colors, and the optical system becomes compact. Incidentally, in this embodiment, although the three dichroic mirrors are arranged in the order described above, the order of arrangement of these dichroic mirrors may be modified.

Next, the function of the three microlens arrays 105, 105', and 106 as optical means in which the beams of light of the three colors R, G, and B separated by the dichroic mirrors 102, 103 and 104 are accurately made incident on desired pixels of the liquid crystal panel 107, will be described with reference to FIGS. 2 and 3.

Figure 2:
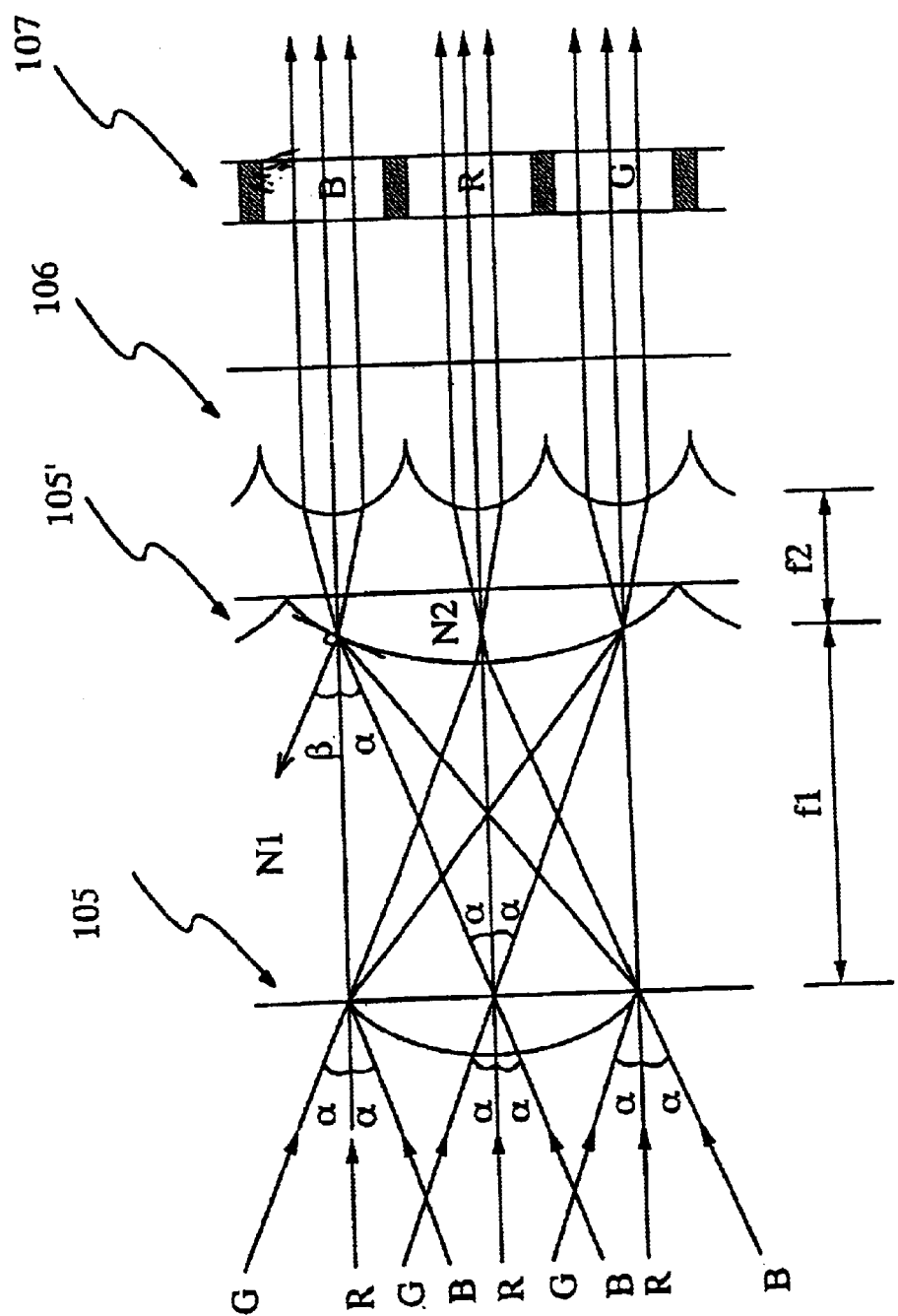
FIG. 2 is a view showing the relation among a first microlens, a second microlens, a third microlens, a pixel, and a beam of light passing through a liquid crystal panel in the liquid crystal projector of Embodiment 1 of the present invention.
Figure 3:
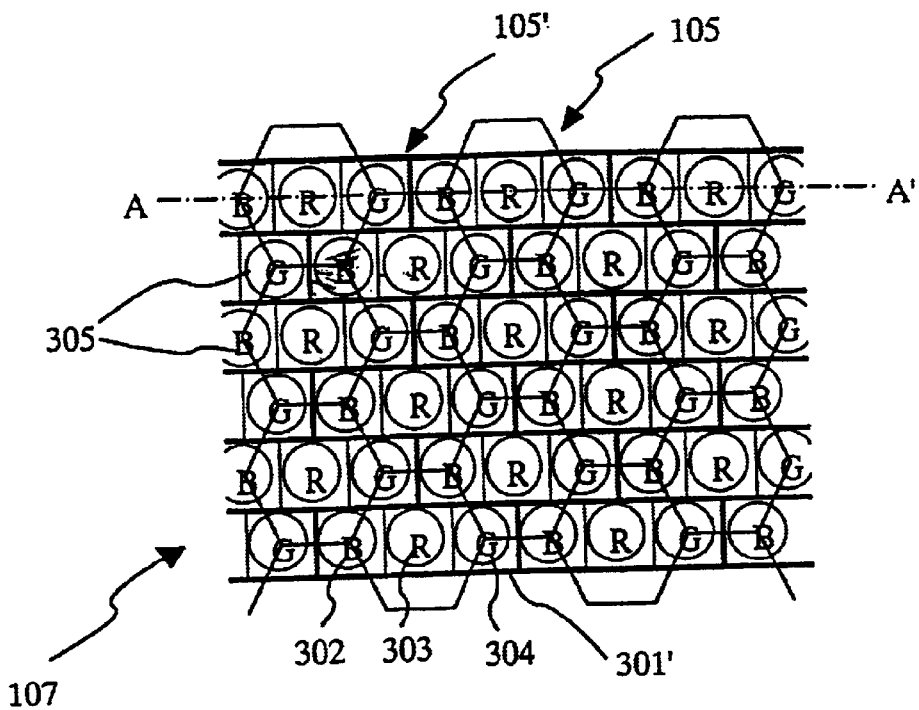
FIG. 3 is a view showing the positional relation among a first microlens, a second microlens, and a pixel in the liquid crystal projector of Embodiment 1 of the present invention.

FIG. 2 is a view of a section taken along line A–A' in FIG. 3 and seen from the above, and shows the corresponding relation among the microlens arrays 105, 105', and 106, and pixels of the liquid crystal panel 107. Each of microlenses constituting the microlens arrays 105 and 105' includes an area equal to three pixels of B, R, and G of the liquid crystal panel 107, and they are arranged with the center of the pixel of R. Each of microlenses constituting the microlens array 106 has a size equal to one pixel of the liquid crystal panel 107.

FIG. 3 shows the pixel arrangement of the liquid crystal panel, the shapes of the microlens arrays 105 and 105', and their corresponding relation. Since the pixel arrangement of the liquid crystal panel is a delta arrangement, the shape of the microlens array 105 is made a hexagon in this embodiment. However, the shape is not necessarily limited to this, but such an arrangement may be adopted that microlenses each having a rectangular shape and a size of the three pixels of the liquid crystal panel 107 are arranged like laid bricks. Each of microlenses 301 constituting the microlens array 105' is arranged to cover three microlens 106 and three pixels (302, 303, 304) of the liquid crystal panel 107 when viewed from the incident direction of light. From the drawing, it is understood that one microlens 301 and one microlens 301' correspond to the three pixels (302, 303, 304) of the liquid crystal panel 107 corresponding to the three primary colors of R, G, and B.

FIG. 3 also shows the shape of the pixel of the liquid crystal panel 107 and the microlens array 106, and their corresponding relation. When attention is paid to the microlens 305, it is understood that one microlens 305 corresponds to each pixel of the liquid crystal panel 107. In this embodiment, although the shape of the microlens 305 is made a hexagon like the microlens 301, for convenience of explanation, the shape is shown as a circle in FIG. 3. The shape of the microlens 305 may be circular. In this case, as the need arises, a gap between the lenses may be filled with a material absorbing light. Moreover, the shape of the microlens 305 can be controlled by the manufacturing process. Moreover, the shape of the microlens 305 can be determined by optical parameters of the microlenses 301 and 301'.

Figure 4:
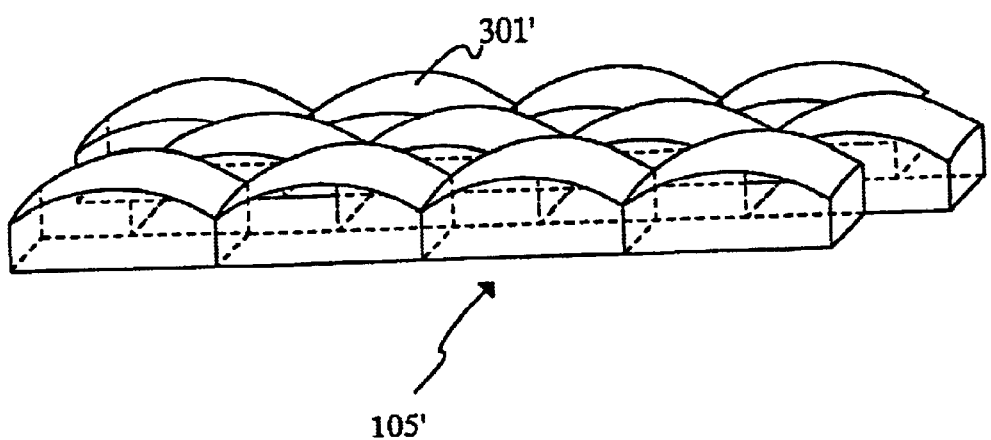
FIG. 4 is a view showing the positional relation between the third microlens and the pixel in the liquid crystal projector of Embodiment 1 of the present invention.

FIG. 4 is a perspective view of the microlens array 105'. As shown in FIG. 4, each of the microlenses 301' constituting the microlens array 105' has such a shape that four corners of a convex lens are cut away. This microlens 301' corresponds to the three pixels of B, R, and G.

The above microlens arrays 105 to 106 can be manufactured by, for example, an ion exchange method (for example, Appl. Optics, 21(6) p. 1052 (1982), Electron Lett., 17 p. 452 (1981)), a method of using optical polymerization polymer (for example, Suzuki et al; "New Manufacturing Method of Plastic Microlens", the 24th Society for the Study of Microoptics), a method of forming a lens by means of surface tension by heating photoresist (for example, Zoran D. Popovic et al., Appl. Optics, 27 p. 1281 (1988)), an evaporation method (for example, Japanese Patent Laid-Open No. Sho. 61-64158), a mechanical working method, a method disclosed in Japanese Patent Laid-Open No. Hei. 3-248125, or the like. As an applied example of a microlens to a liquid crystal projector, there is known a method (Hamada et al., ASIA DISPLAY '95, p. 887 (1995)) in which the microlens is formed in the inside of an incident side substrate of a liquid crystal panel, so that an effective aperture ratio of the liquid crystal panel is improved.

Again, in FIG. 2, the beams of light of the three colors R, G, and B separated by the dichroic mirrors are incident on the first microlens array 105, the respective principal rays (rays passing through the center of the microlens 105) are emitted at angles $+\alpha$, 0, $-\alpha$ (in this embodiment $\alpha=6.1°$) from the microlens array 105. Each light flux is condensed on the focal surface of the microlens array 105 through a medium with refractive index N1 (in this embodiment, the medium is air and N1=1.00). Here, the condition where the condensed spots of G and B are positioned at the center line of the corresponding pixels is $\tan\alpha=P/f1$. Where, P is a pixel pitch and is 50 pm in this embodiment, and f1 is a focal distance of the microlens array 105 and is 465 $\mu$m (air conversion value) in this embodiment. Since the position of the condensed spot overlaps with the second microlens array, the distance between the first microlens and the second microlens becomes also 465 $\mu$m (air conversion value). Next, the principal rays of the beams of light of colors G and B are refracted by the second microlens array 105' made of a medium having radius of curvature R and refractive index N2, and are vertically incident on the microlens array 106. Incidentally, from the law of refraction, the condition of the vertical incidence is $N1\cdot\sin(\alpha+\beta)=N2\cdot\sin\beta$, where $\beta$ is an angle between a lens surface normal line at the refraction position and an optical axis, and satisfies $R\cdot\sin\beta=P$. In this embodiment, $\beta=10°$, N2=1.60, and R=288 $\mu$m. Rays other than the principal rays are similarly bent, and are incident on the microlens array 106 at a predetermined divergence angle.

The size and the focal distance of the third microlens array 106 are respectively ⅓ of those of the first microlens array 105. Thus, the focal distance f2 in this embodiment is f2=465/3=155 $\mu$m (air conversion value). The distance between the second microlens array and the third microlens array is also 155 $\mu$m (air conversion value). Thus, the divergent beams of light having passed through the second microlens array 105' are made parallel to each other by the microlens array 106. These beams of light of colors R, G, and B are respectively incident on the corresponding pixels of the liquid crystal panel 107, and are subjected to intensity modulation according to the picture signal.

The beams of light having passed through the liquid crystal panel 107 are condensed by the field lens 108, and are incident on the projection lens 109. Thereafter, the beams of light are projected on the screen 110 by the projection lens 109, and a picture is made on the screen 110.

As described above, in this embodiment, the three dichroic mirrors are arranged at different angles so that the white light is separated, and the separated beams of light as parallel light flux can be made incident on the corresponding pixel opening portions by the three microlens arrays. By this, although the projector is a single plate type projector, the light from the light source can be effectively used, and a bright picture can be obtained. Moreover, since the divergent angle of the light having passed through the liquid crystal panel is suppressed, the F number of the projection lens can be set larger than a conventional value. Thus, since a projection lens having a small aperture can be used, the miniaturization and low cost of a device can be achieved.

Figure 5:
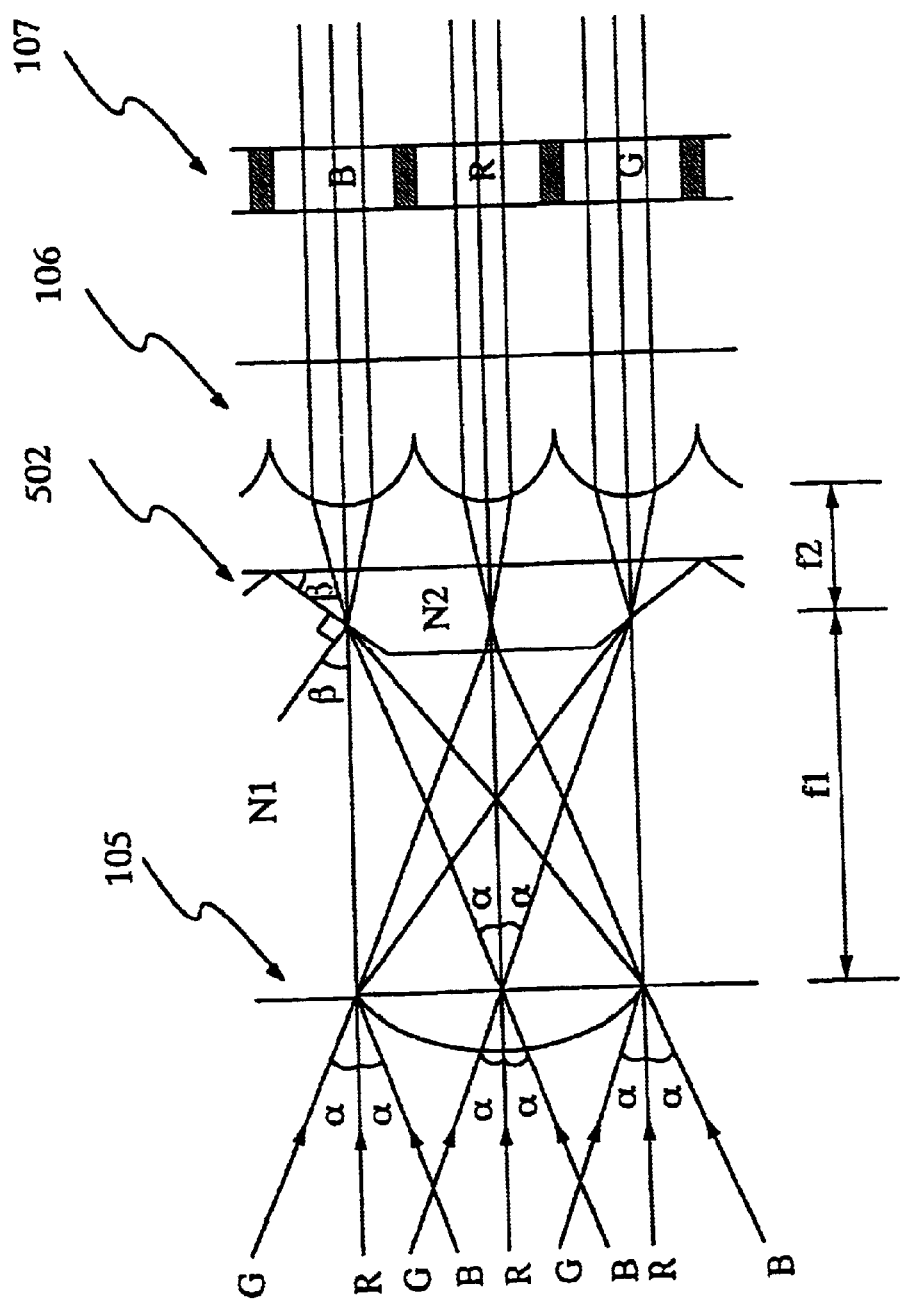
FIG. 5 is a view showing the relation among a first microlens, a second trapeziform prism, a third microlens, a pixel, and a beam of light passing through a liquid crystal panel in another liquid crystal projector of Embodiment 1 of the present invention.

As another mode of this embodiment, as shown in FIG. 5, a trapeziform prism 502 may be used as the second optical means instead of the microlens array 105'. The trapeziform prism 502 has a size equal to the size of three pixels, and is positioned at a place corresponding to the first microlens array 105. The distance between both is 465 $\mu$m which is the same as the former case. The prism is made of a material with refractive index N2, and the interface is in contact with a medium having diffractive index N1. The beams of light of the colors G and B are refracted at a slant portion of the prism, and the main light beam is vertically incident on the microlens array 106. The condition of the vertical incidence is given by the law of refraction as described above by $N1\cdot\sin(\alpha+\beta)=N2\cdot\sin\beta$. $\beta$ is a slant angle of the prism and in this embodiment, $\beta=10°$ (when N1=1.00, N2=1.60, $\alpha=6.1°$). By this, the same effect as the above can be obtained.

Here, the ECB mode (electric field control birefringence) used as a display mode of the liquid crystal panel 107 of this embodiment will be described.

Figure 20C:
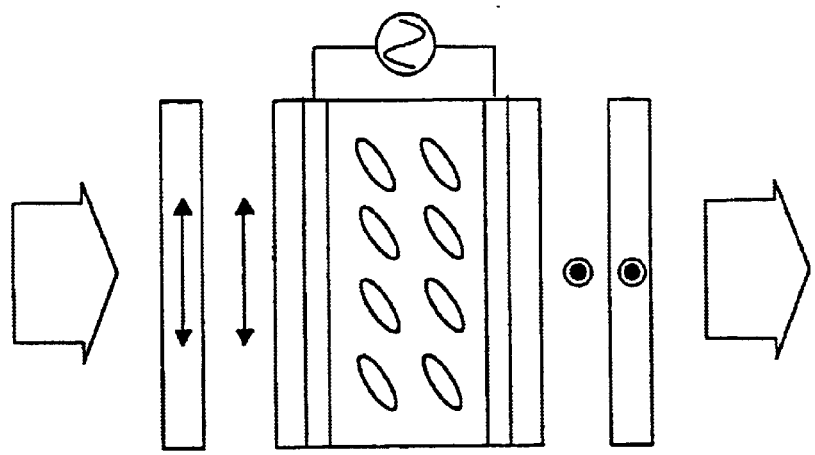
FIGS. 20A to 20C are views showing the operation principle of an ECB mode of Embodiment 1.
Figure 20B:
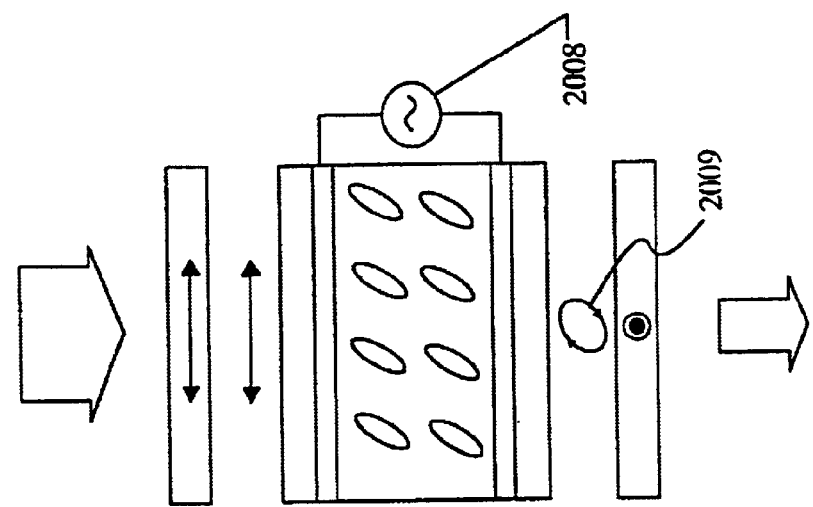
Figure 20A:
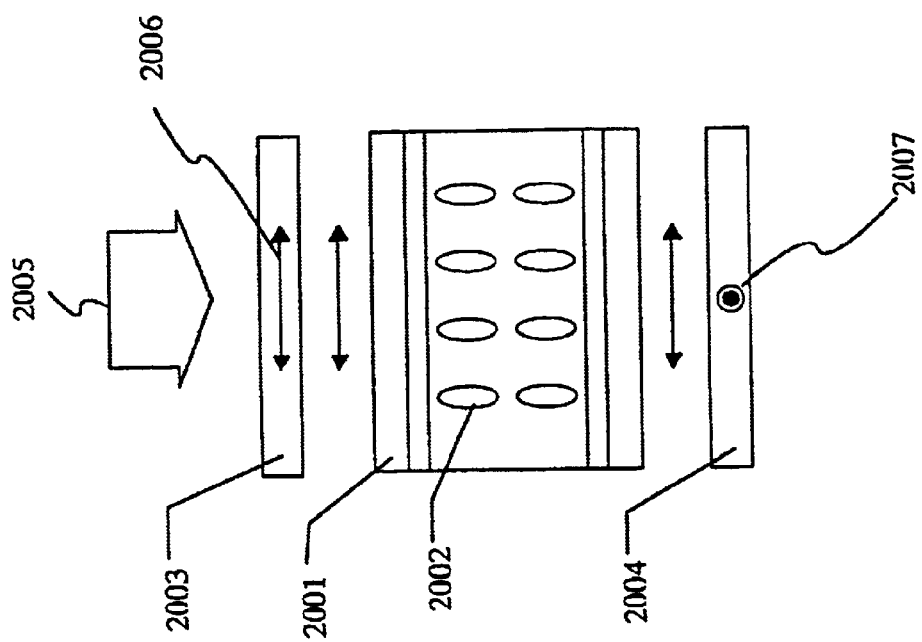

Reference will be made to FIGS. 20A to 20C. In FIGS. 20A to 20C, reference numeral 2001 denotes a liquid crystal panel, 2002 denotes liquid crystal molecules in the liquid crystal panel 2001, 2003 and 2004 denote polarizing plates, and 208 denotes an alternating-current power supply. Reference numeral 2005 denotes incident light. Reference numerals 2006 and 2007 denote polarized light transmission axes of the polarizing plates 2003 and 2004, respectively. The axis 2006 is parallel to a paper surface, and the axis 2007 is vertical to the paper surface.

As shown in FIG. 20A, in the ECB mode of vertical orientation using an n-type liquid crystal, the liquid crystal molecules in the liquid crystal panel are vertically oriented to the substrate in the state where a voltage is not applied. In the pair of polarizing plates 2003 and 2004, the directions of the respective polarized light transmission axes cross each other at right angles (so-called cross Nicol), and the plates are arranged so as to sandwich the liquid crystal panel 2001.

In the state (FIG. 20A) in which a voltage is not applied, the incident light 2005 is polarized by the polarizing plate 2003 in the direction parallel to the paper surface, and passes through the liquid crystal layer as it is. The light having passed through the liquid crystal panel does not pass through the polarizing plate 2004, the direction of the polarized light transmission axis of which crosses at right angles. Thus, a dark state (black state) is made. Like this, a mode in which a dark state is made when a voltage is not applied is called a normally black mode.

Next, as shown in FIG. 20B, in the case where a voltage is applied to the liquid crystal panel, the orientation of the liquid crystal molecules is changed, so that the liquid crystal molecules are oriented obliquely to the substrate. In this case, by the birefringence effect of the liquid crystal, a phase difference occurs between the component of the incident light parallel to the molecular major axis of the liquid crystal and the component of the incident light vertical to the major axis, so that the light is changed into elliptical polarized light. Part of the elliptical light emitting from the liquid crystal panel can pass through the polarizing plate 2004 at the exist side. Thus, a bright state (white state) is made.

The above phase difference is given by the product of birefringence Δn of the liquid crystal (=diffractive index in the direction of the molecular major axis of the liquid crystal−diffractive index in the direction vertical to the molecular major axis of the liquid crystal) and a distance d which the light travels in the liquid crystal panel.

In the case where a higher voltage is applied (FIG. 20C), the liquid crystal molecules are oriented more obliquely to the substrate. At this time, a larger phase difference occurs in the linearly polarized light passing through the liquid crystal panel, and is emitted from the liquid crystal panel in the state where the polarizing direction is twisted 90 degrees. The retardation (Δn·d) of the liquid crystal panel is determined so that the emitted light completely passes through the polarizing plate and the brightest state is obtained. In this embodiment, a rubbing process is carried out so that the liquid crystal molecules have a pretilt angle in the direction of 45° with respect to the polarizing axis of the two polarizing plates crossing each other at right angles. The moving direction of the liquid crystal molecules when a voltage is applied is determined by the direction of the pretilt angle.

As described above, in the case where display of the liquid crystal panel is made by the ECB mode of vertical orientation using the n type liquid crystal, the distance which light travels in the liquid crystal panel becomes important.

In this embodiment, the liquid crystal panel 107 makes display in the ECB mode of vertical orientation using the n type liquid crystal and the normally black mode is adopted in which black display is made when a voltage is not applied. As described above, the liquid crystal panel making display in the ECB mode uses the phenomenon that when light travels in the liquid crystal panel, a phase difference occurs by birefringence of the liquid crystal, and the polarizing state is changed. Moreover, the above phase difference is proportional to the distance which light travels in the liquid crystal panel. Thus, as in this embodiment, when the beams of light incident on the liquid crystal panel are collimated in advance to make the beams of light having high parallelity, it is possible to suppress the dispersion of distances which the beams of light travel in the liquid crystal panel.

This embodiment uses the liquid crystal panel which makes display in the ECB mode of vertical orientation using the n type liquid crystal. In the case where a liquid crystal panel is made to display in the ECB mode, the distance which the light travels in the liquid crystal panel is important. This is because the information given to the light by the liquid crystal molecules in the liquid crystal panel depends on birefringence of the liquid crystal molecules and the distance which the light travels in the liquid crystal panel. In this embodiment, the beams of light condensed and distributed by the microlenses of the microlens array 105 are collimated by the microlens array 106, and the beams of light having heightened parallelity are made incident on the corresponding pixels of the liquid crystal panel, so that it is possible to suppress the occurrence of dispersion of the distances which the beams of light travel in the liquid crystal panel. Thus, superior display can be obtained.

Since the liquid crystal panel 107 of this embodiment operates in the normally black mode, even in the case where a defect occurs in a TFT of part of the liquid crystal panel and a pixel corresponding to the TFT causes operation failure, the pixel becomes black display. Thus, even if it is projected on a screen, lowering of a picture quality can be prevented.

Here, manufacturing steps of the liquid crystal panel 107 used in this embodiment will be described. In this embodiment, an example in which a plurality of TFTs are formed on a substrate having an insulating surface, and a pixel matrix circuit and a peripheral circuit are monolithically formed, will be described with reference to FIGS. 6 to 9. In this embodiment, as an example of the peripheral circuit, such as a driver circuit or a logic circuit, a CMOS circuit as a basic circuit will be shown.

Reference will be made to FIGS. 6A to 6D. First, a quartz substrate 601 is prepared as a substrate having an insulating surface. Instead of the quartz substrate, a silicon substrate on which a thermal oxidation film is formed may be used. Moreover, such a method may be adopted that an amorphous silicon film is temporarily formed on a quartz substrate and the film is completely thermally oxidized to form an insulating film. In addition, a quartz substrate, a ceramic substrate, or a silicon substrate, each having a silicon nitride film formed as an insulating film, may be used.

Reference numeral 602 denotes an amorphous silicon film, and adjustment is made so that a final film thickness (film thickness determined after paying consideration to a film decrease subsequent to thermal oxidation) becomes 10 to 75 nm (preferably 15 to 45 nm). In the film formation, it is important to thoroughly manage the concentration of impurities in a film.

In the case of this embodiment, management is made so that the concentration of each of C (carbon), N (nitrogen), O (oxygen), and S (sulfur) which are typical impurities in the amorphous silicon film 602, becomes less than $5 \times 10^{18}$ atoms/cm$^3$ (preferably $1 \times 10^{18}$ atoms/cm$^3$ or less). If the concentration of any one of the impurities exceeds the above value, the impurity has a bad influence at crystallization and may cause a film quality to be degraded after the crystallization.

The concentration of hydrogen in the amorphous silicon film 602 is also a very important parameter, and it appears that as the hydrogen content is made low, a film with superior crystallinity is obtained. Thus, it is preferable to form the amorphous silicon film 602 by a low pressure CVD method. A plasma CVD method may also be used if film forming conditions are optimized.

Next, a crystallizing step of the amorphous silicon film 602 is carried out. A technique disclosed in Japanese Patent Laid-Open No. Hei. 7-130652 is used as a means for crystallization. Although both means of embodiment 1 and embodiment 2 disclosed in the publication may be used, in this embodiment, it is preferable to use the technical content (described in detail in Japanese Patent Laid-Open No. Hei. 8-78329) set forth in the embodiment 2 of the publication.

According to the technique disclosed in Japanese Patent Laid-Open No. Hei. 8-78329, a mask insulating film 603 for selecting an added region of a catalytic element is first formed. The mask insulating film 603 has a plurality of openings for addition of the catalytic element. The positions of crystal regions can be determined by the positions of the openings.

Figure 6A:
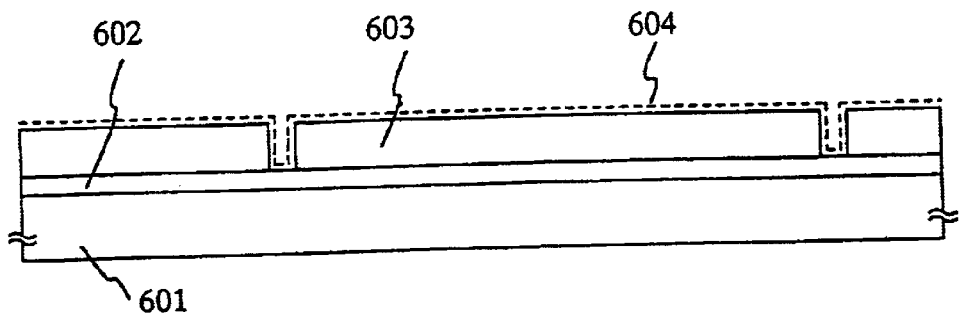
FIGS. 6A to 6D are views showing manufacturing steps of Embodiment 1 of TFTs.

A solution containing nickel (Ni) as the catalytic element for facilitating the crystallization of the amorphous silicon film is applied by a spin coating method to form a Ni containing layer 604. As the catalytic element, cobalt (Co), iron (Fe), palladium (Pd), platinum (Pt), copper (Cu), gold (Au), germanium (Ge), or the like may be used other than nickel (FIG. 6A).

As the foregoing adding step of the catalytic element, an ion implantation method or a plasma doping method using a resist mask may also be used. In this case, since it becomes easy to decrease an occupied area of an added region and to control a growth distance of a lateral growth region, the method becomes an effective technique when a minute circuit is formed.

Next, after the adding step of the catalytic element is ended, dehydrogenating is carried out at about 450° C. for 1 hour, and then, a heat treatment is carried out in an inert gas atmosphere, a hydrogen atmosphere, or an oxygen atmosphere at a temperature of 500 to 700° C. (typically 550 to 650° C.) for 4 to 24 hours to crystallize the amorphous silicon film 602. In this embodiment, a heat treatment is carried out in a nitrogen atmosphere, at 570° C., and for 14 hours.

Figure 6B:
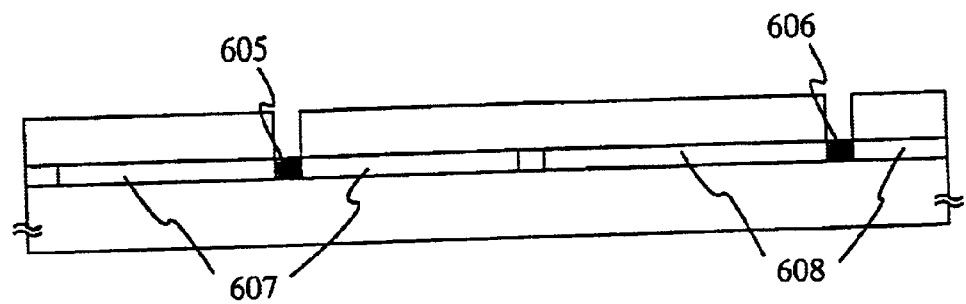

At this time, crystallization of the amorphous silicon film 602 progresses first from nuclei produced in regions 605 and 606 added with nickel, and crystal regions 607 and 608 grown almost parallelity to the surface of the substrate 601 are formed. The crystal regions 607 and 608 are respectively referred to as a lateral growth region. Since respective crystals in the lateral growth region are gathered in a comparatively uniform state, the lateral growth region has such an advantage that the total crystallinity is superior (FIG. 6B).

Incidentally, even in the case where the technique set forth in embodiment 1 of the above-mentioned Japanese Patent Laid-Open No. Hei. 7-130652 is used, a region which can be called a lateral growth region is microscopically formed. However, since production of nuclei occurs irregularly in the surface, it is difficult to control crystal grain boundaries.

Figure 6C:
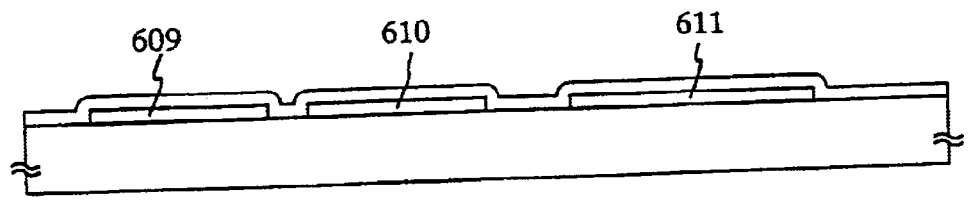

After the heat treatment for crystallization is ended, the mask insulating film 603 is removed and patterning is carried out, so that island-like semiconductor layers (active layers) 609, 610, and 611 made of the lateral growth regions 607 and 608 are formed (FIG. 6C).

Here, reference numeral 609 denotes the active layer of the N-channel TFT constituting the CMOS circuit, 610 denotes the active layer of the P-channel TFT constituting the CMOS circuit, and 611 denotes the active layer of the N-channel TFT (pixel TFT) constituting the pixel matrix circuit.

After the active layers 609, 610 and 611 are formed, a gate insulating film 612 made of an insulating film containing silicon (for example, silicon oxide, silicon nitride, silicon oxide nitride, etc) is formed thereon.

Figure 6D:
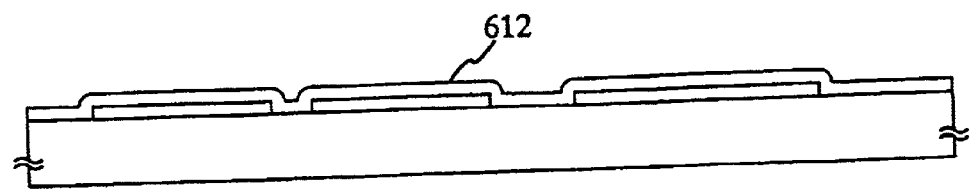

Next, as shown in FIG. 6D, a heat treatment (gettering process for the catalytic element) for removing or reducing the catalytic element (nickel) is carried out. In this heat treatment, a halogen element is made contained in a processing atmosphere and the gettering effect for a metallic element by the halogen element is used. Incidentally, a gettering process of the catalytic element may be carried out also prior to the formation of the gate insulating film 612. Alternatively, only either step may be carried out.

In order to sufficiently obtain the gettering effect by the halogen element, it is preferable to carry out the above heat treatment at a temperature exceeding 700° C. If the temperature is not higher than this temperature, it becomes difficult to decompose a halogen compound in the processing atmosphere, so that there is a fear that the gettering effect can not be obtained.

Thus, in this embodiment, the heat treatment is carried out at a temperature exceeding 700° C., preferably 800 to 1000° C. (typically 950° C.), and a processing time is made 0.1 to 6 hours, typically 0.5 to 1 hour.

In this embodiment, there is shown an example in which a heat treatment is carried out in an oxygen atmosphere containing hydrogen chlorine (HCl) of 0.5 to 10 vol % (in this embodiment, 3 vol %) at 950° C. for 30 minutes. If the concentration of HCl is higher than the above-mentioned concentration, asperities comparable to a film thickness are produced on the surfaces of the active layers 609, 610 and 611. Thus, such a high concentration is not preferable.

Although an example in which the HCl gas is used as a compound containing a halogen element has been described, one kind or plural kinds of gases selected from compounds containing halogen, such as typically HF, $NF_3$, HBr, $Cl_2$, $ClF_3$, $BCl_3$, $F_2$, and $Br_2$, may be used other than the HCl gas.

In this step, it is conceivable that nickel is removed in such a manner that nickel in the active layers 609, 610 and 611 is gettered by the action of chlorine and is transformed into volatile nickel chloride which is released into the air. By this step, the concentration of nickel in the active layers 609, 610 and 611 is lowered down to $5\times10^{17}$ atoms/$cm^3$ or less.

Incidentally, the value of $5\times10^{17}$ atoms/$cm^3$ is the lower detection limit of the SIMS (Secondary Ion Mass Spectroscopy). As the result of analysis of TFTs experimentally produced by the present inventors, when the concentration was not higher than $1\times10^{18}$ atoms/$cm^3$ (preferably $5\times10^{17}$ atoms/$cm^3$ or less), an influence of nickel upon TFT characteristics was not ascertained. However, the concentration of an impurity in the present specification is defined in measurement results of the SIMS analysis.

By the above heat treatment, a thermal oxidation reaction progresses at the interface between the gate insulating film 612 and the active layers 609, 610 and 611, so that the thickness of the gate insulating film 612 is increased by the thickness of a thermal oxidation film. When the thermal oxidation film is formed in this way, it is possible to obtain an interface of semiconductor/insulating film, which has very few interfacial levels. Moreover, there is also an effect to prevent inferior formation (edge thinning) of the thermal oxidation film at the end of the active layer.

Further, it is also effective that after the heat treatment in the above-mentioned halogen atmosphere is carried out, a heat treatment approximately at 950° C. for about one hour is carried out in a nitrogen atmosphere to improve the film quality of the gate insulating film 612.

Incidentally, it is also ascertained by the SIMS analysis that the halogen element, which was used for the gettering process, having a concentration of $1\times10^{15}$ to $1\times10^{20}$ atoms/$cm^3$ remains in the active layers 609, 610 and 611. Moreover, it is ascertained by the SIMS analysis that at that time, the foregoing halogen element with a high concentration is distributed between the active layers 609, 610 and 611 and the thermal oxidation film formed by the heat treatment.

Moreover, as the result of the SIMS analysis for other elements, it was ascertained that the concentration of any of C (carbon), N (nitrogen), O (oxygen), and S (sulfur) as typical impurities was less than $5\times10^{18}$ atoms/$cm^3$ (typically $1\times10^{18}$ atoms/$cm^3$ or less).

Figure 7A:
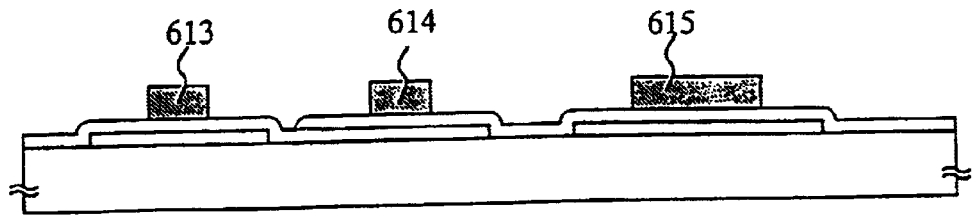
FIGS. 7A to 7D are views showing manufacturing steps of Embodiment 1 of the TFTs.

Next, a not-shown metal film containing aluminum as the main ingredient is formed, and originals 613, 614 and 615 of subsequent gate electrodes are formed by patterning. In this embodiment, an aluminum film containing scandium of 2 wt % is used (FIG. 7A).

Figure 7B:
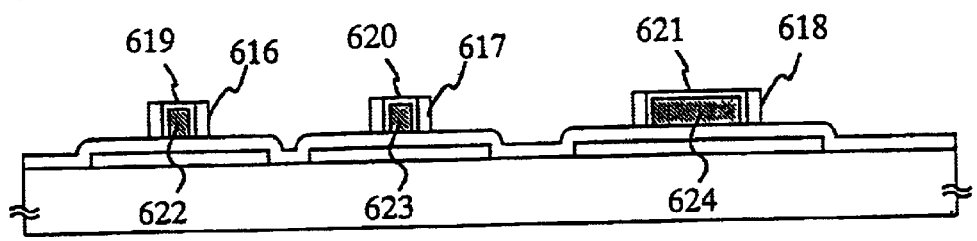
Figure 7C:
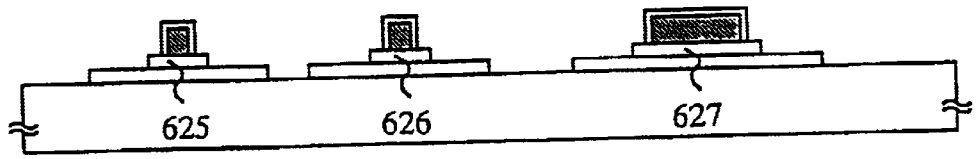

Next, by a technique disclosed in Japanese Patent Laid-Open No. Hei. 7-135318, porous anodic oxidation films 616, 617 and 618, nonporous anodic oxidation films 619, 620 and 621, and gate electrodes 622, 623 and 624 are formed (FIG. 7B).

After the state shown in FIG. 7B is obtained in this way, the gate insulating film 612 is next etched by using the gate electrodes 622, 623 and 624, and the porous anodic oxidation films 616, 617 and 618 as masks. Then the porous anodic oxidation films 616, 617 and 618 are removed to obtain the state shown in FIG. 7C. Incidentally, reference numerals 625, 626 and 627 in FIG. 7C denote gate insulating films after processing.

Next, an adding step of impurities giving one conductivity of an N type or a P type is carried out. As the impurity elements, P (phosphorus) or As (arsenic) may be used for the N type, and B (boron) may be used for the P type.

In this embodiment, the addition of impurities is divided and is carried out two times. The first impurity addition (P (phosphorus) is used in this embodiment) is carried out at a high acceleration voltage of about 80 kV to form an n⁻ region. Adjustment is made so that the concentration of P ions in the n⁻ region becomes $1\times10^{18}$ to $1\times10^{19}$ atoms/cm³.

Further, the second impurity addition is carried out at a low acceleration voltage of about 10 kV to form an n⁺ region. Since the acceleration voltage is low at this time, the gate insulating film functions as a mask. Adjustment is made so that the sheet resistance of the n⁺ region becomes 500 Ω or less (preferably 300 Ω or less).

Through the above steps, a source region 628, a drain region 629, a low concentration impurity region 630, and a channel formation region 631 of the N type TFT constituting the CMOS circuit are formed. Moreover, a source region 632, a drain region 633, a low concentration impurity region 634, and a channel formation region 635 of the N-channel TFT constituting the pixel TFT are defined (FIG. 7D).

Figure 7D:
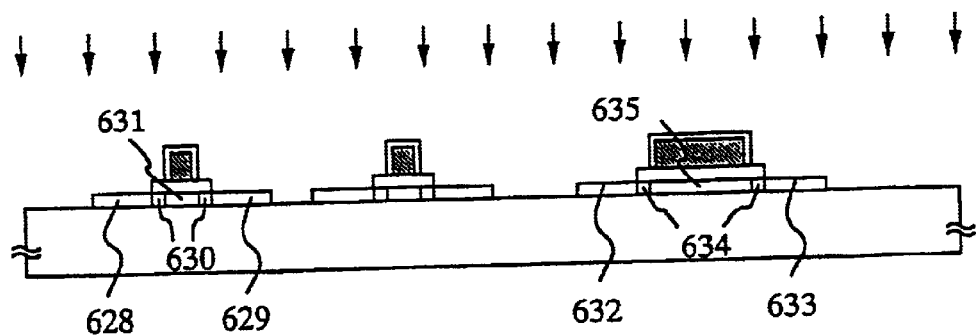

In the state shown in FIG. 7D, the active layer of the P type TFT constituting the CMOS circuit has the same structure as the active layer of the N type TFT.

Figure 8A:
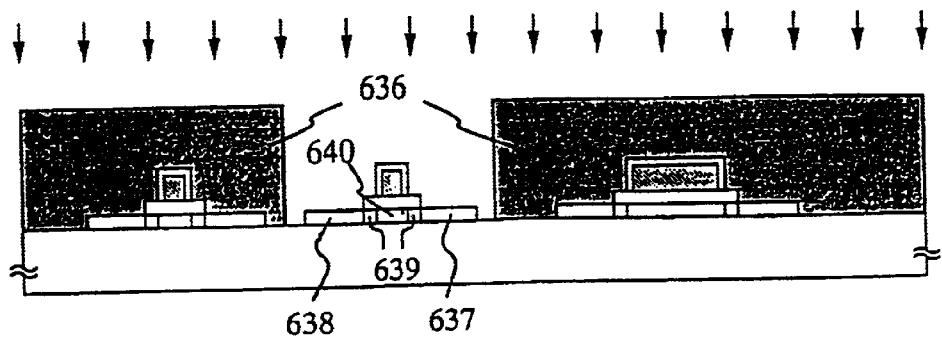
FIGS. 8A to 8C are views showing manufacturing steps of Embodiment 1 of the TFTs.
Figure 8B:
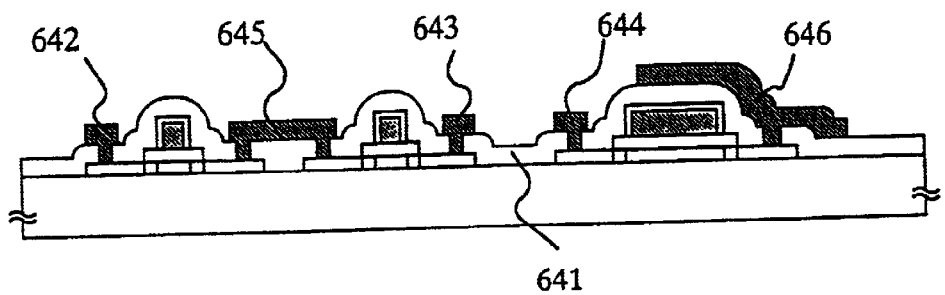

Next, as shown in FIG. 8A, a resist mask 636 covering the N type TFTs is provided, and an impurity ion for giving the P type (boron is used in this embodiment) is added.

Although this step is also divided and is carried out two times like the foregoing adding step of the impurity, since the N type must be inverted to the P type, the B (boron) ion with a concentration several times the foregoing addition concentration of the P ion is added.

In this way, a source region 637, a drain region 638, a low concentration impurity region 639, and a channel formation region 640 of the P type TFT constituting the CMOS circuit are formed (FIG. 8A).

After the active layer is completed in the manner as described above, activation of the impurity ions is made by the combination of furnace annealing, laser annealing, lamp annealing, and the like. At the same time, damages of the active layers caused in the adding steps are also repaired.

Next, as an interlayer insulating film 641, a lamination film of a silicon oxide film and a silicon nitride film is formed. Next, after contact holes are formed, source electrodes 642, 643 and 644, and drain electrodes 645 and 646 are formed to obtain the state shown in FIG. 8B.

Figure 8C:
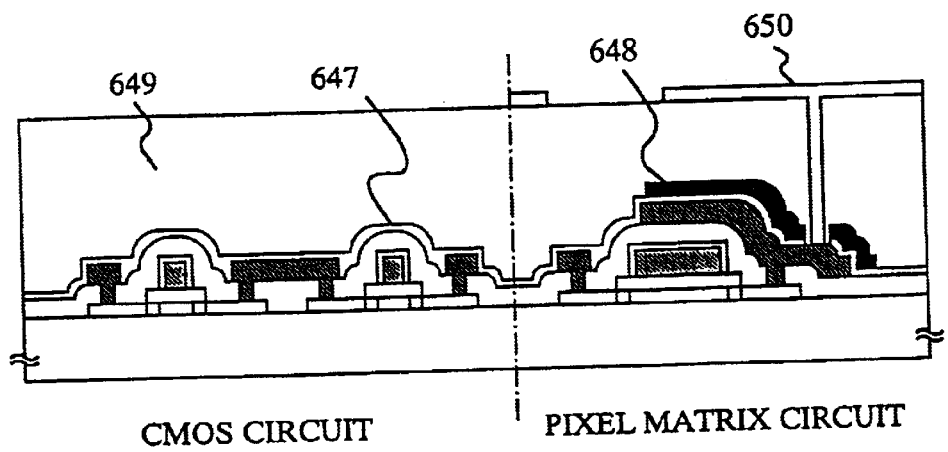

Next, a silicon nitride film 647 with a thickness of 10 to 50 nm and a black mask 648 are formed (FIG. 8C). The black mask 648 can be formed of a conductive film, e.g., a titanium film.

In the structure of FIG. 8C, a storage capacitance is formed between the drain electrode 646 and the black mask 648 through the silicon nitride film 647.

Like this, in the structure of FIG. 8C, the feature is that the black mask 648 serves also as an upper electrode of the auxiliary capacitance.

Incidentally, in the structure as shown in FIG. 8C, it is possible to prevent lowering of an aperture ratio by forming the storage capacitance, which is apt to occupy a large area, over a TFT. Moreover, since a silicon nitride film with high dielectric constant and a thickness of about 25 nm can be used, it is possible to secure very large capacitance with a small area.

Next, the entire of the substrate is heated in a hydrogen atmosphere at a temperature of 350° C. for 1 to 2 hours to hydrogenate the entire of the device, so that the dangling bonds (unpaired bonds) in the film (especially in the active layer) are compensated. Through the above steps, it is possible to manufacture the CMOS circuit and the pixel matrix circuit on the same substrate.

Next, a second interlayer insulating film 649 made of an organic resin film and having a thickness of 0.5 to 3 μm is formed. Then a conductive film is formed on the interlayer insulating film 649 and is patterned, so that a pixel electrode 650 is formed. Since this embodiment relates to an example of a transmission type, a transparent conductive film, such as an ITO, is used as the conductive film forming the pixel electrode 650.

Figure 9:
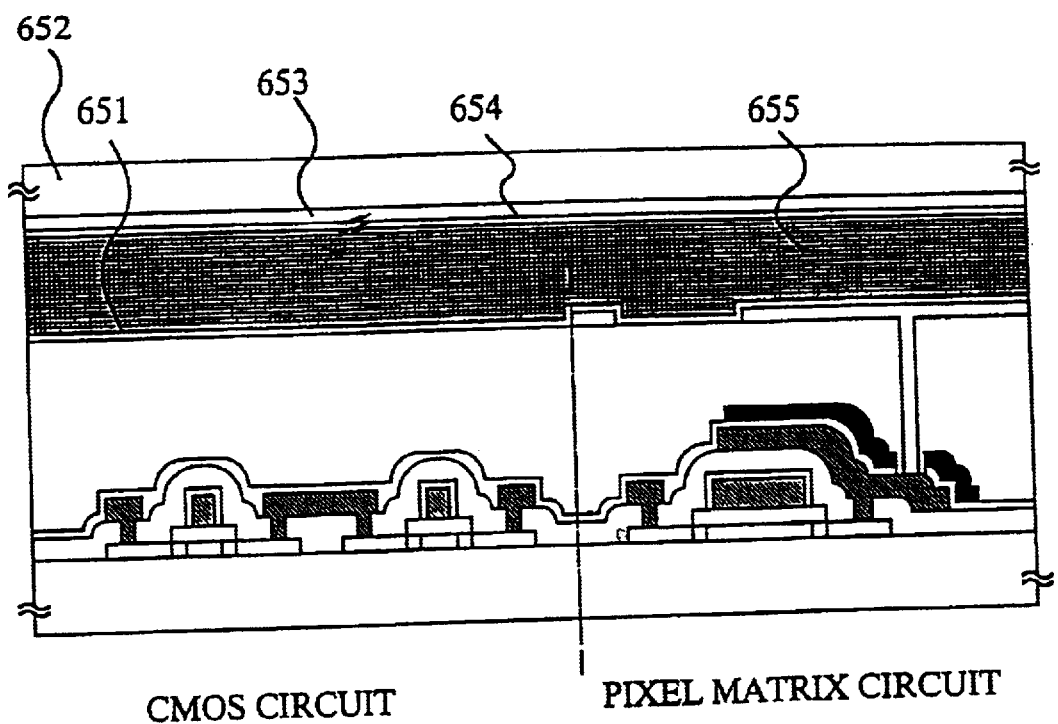
FIG. 9 is a sectional view showing a liquid crystal panel of Embodiment 1.

Next, as shown in FIG. 9, a step of manufacturing a liquid crystal panel on the basis of the active matrix substrate manufactured through the above steps will be described.

An orientation film 651 is formed on the active matrix substrate in the state of FIG. 8C. In this embodiment, polyimide is used for the orientation film 651. Next, an opposite substrate is prepared. The opposite substrate is constituted by a glass substrate 652, a transparent conductive film 653, and an orientation film 654.

In this embodiment, such a polyimide film that liquid crystal molecules are oriented vertically to the substrate is used as the orientation film. Incidentally, after the orientation film is formed, a rubbing process is carried out so that the liquid crystal molecules are vertically oriented with a fixed pretilt angle.

Although a black mask and the like are formed on the opposite substrate, they are omitted here.

Figure 19:
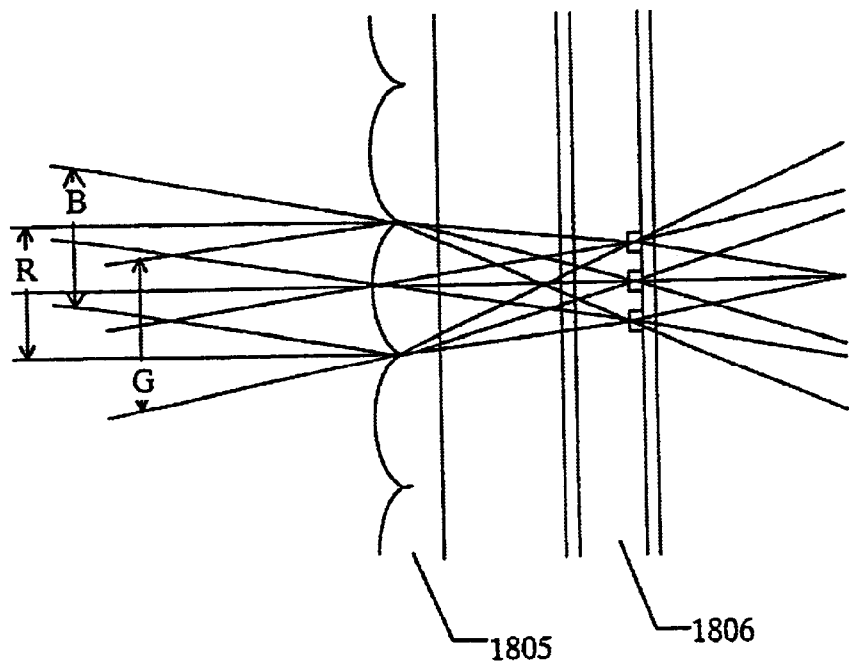
FIG. 19 is a view showing the relation between a microlens and a beam of light passing through a pixel in the conventional single plate type liquid crystal projector using the microlens.

Next, the active matrix substrate obtained through the above steps and the opposite substrate are bonded to each other through a sealing material, a spacer (both are not shown), and the like. Thereafter, a liquid crystal material 655 is injected between both the substrates, and is completely sealed with a sealing agent (not shown). Thus, the transmission type liquid crystal panel as shown in FIG. 19 is completed.

In this embodiment, the liquid crystal panel is designed to make display in the ECB (electric field control birefringence) mode. Thus, a pair of polarizing plates (not shown) in cross Nicol (in the state in which transmission axes of the pair of polarizing plates cross each other at right angles) are disposed such that the liquid crystal panel is sandwiched between the polarizing plates. Incidentally, the polarizing plates are arranged such that the respective transmission axes of the pair of polarizing plates make an angel of 45° with respect to a rubbing direction, that is, the projection axis of the molecular major axis of the liquid crystal onto the substrate.

Thus, it is understood that in this embodiment, display is made in the normally black mode in which black display is made when a voltage is not applied to the liquid crystal panel.

Figure 10:
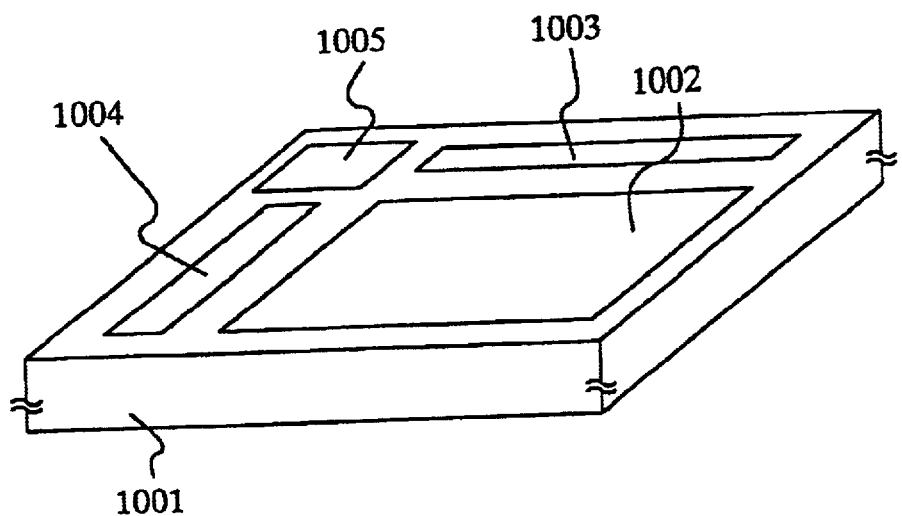
FIG. 10 is a top view showing an active matrix substrate of Embodiment 1.

FIG. 10 schematically shows the outer appearance of the active matrix substrate as shown in FIG. 8C. In FIG. 10, reference numeral 1001 denotes a quartz substrate, 1002 denotes a pixel matrix circuit, 1003 denotes a source driver circuit, 1004 denotes a gate driver circuit, and 1005 denotes a logic circuit.

Although the logic circuit 1005 includes all logical circuits constituted by TFTs in a wide sense, for the purpose of distinguishing the logic circuit here from circuits conventional called a pixel matrix circuit and a driver circuit, the term "logic circuit" used here indicates signal processing circuits (memory, D/A converter, pulse generator, etc.) other than those.

An FPC (Flexible Print Circuit) terminal as an external terminal is attached to the liquid crystal panel formed in this way. In general, what is called a liquid crystal module is a liquid crystal panel in the state where the FPC is attached.

Embodiment 2

In this embodiment, in the liquid crystal projector described in the embodiment 1, a liquid crystal panel in which the arrangement of pixels is changed is used, and the shape of a microlens is changed in accordance with the change of the arrangement.

In this embodiment, a microlens and a liquid crystal panel are different from those of the embodiment 1, and other structural components are the same as the embodiment 1, so that their explanation will be omitted here.

Figure 11:
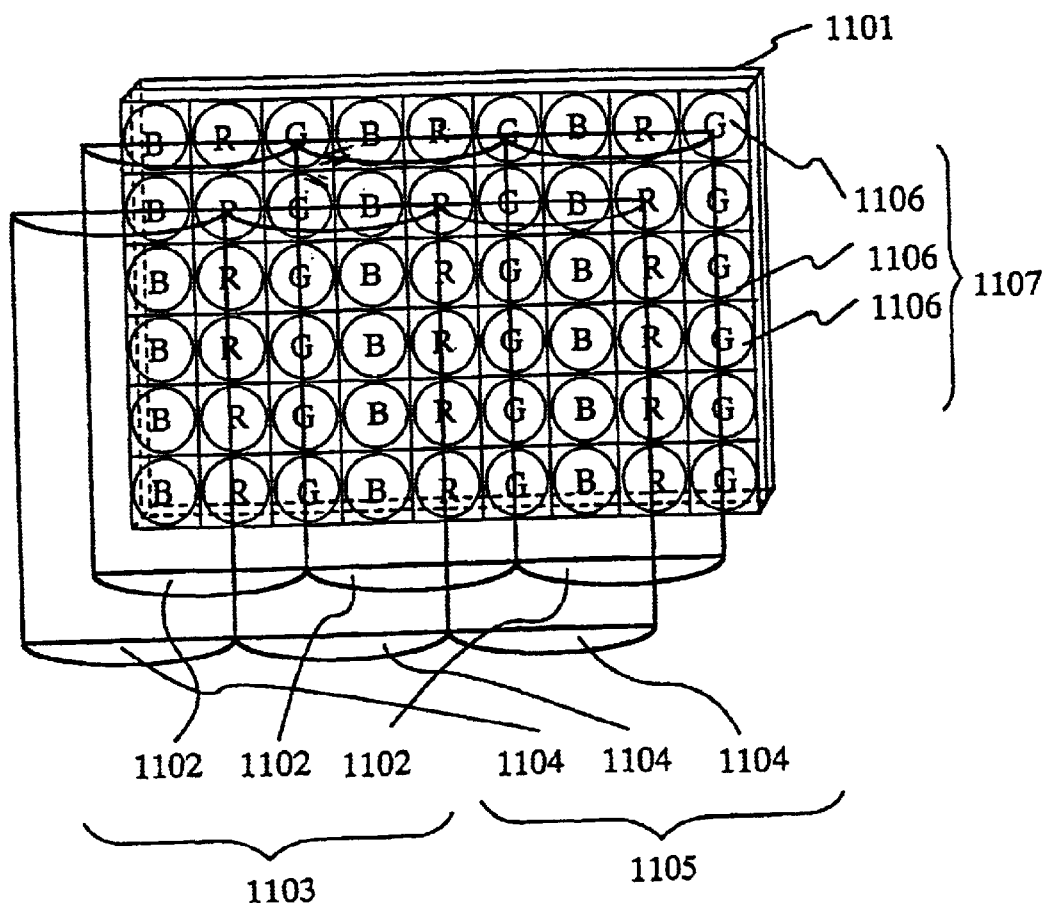
FIG. 11 is a view showing the positional relation among a first lenticular lens, a second lenticular lens, a microlens array, and a pixel in another liquid crystal projector of Embodiment 2 of the present invention.

Reference will be made to FIG. 11. FIG. 11 shows corresponding relation among pixels of a liquid crystal panel 1101, a first lenticular lens 1103 composed of a plurality of cylindrical lenses 1102, a second lenticular lens 1105 composed of a plurality of cylindrical lenses 1104 having the same shape as the first lenticular lens 1103, and a microlens array 1107 composed of a plurality of microlenses 1106. The respective pixels of the liquid crystal panel 1101 of this embodiment form a stripe arrangement.

Figure 12:
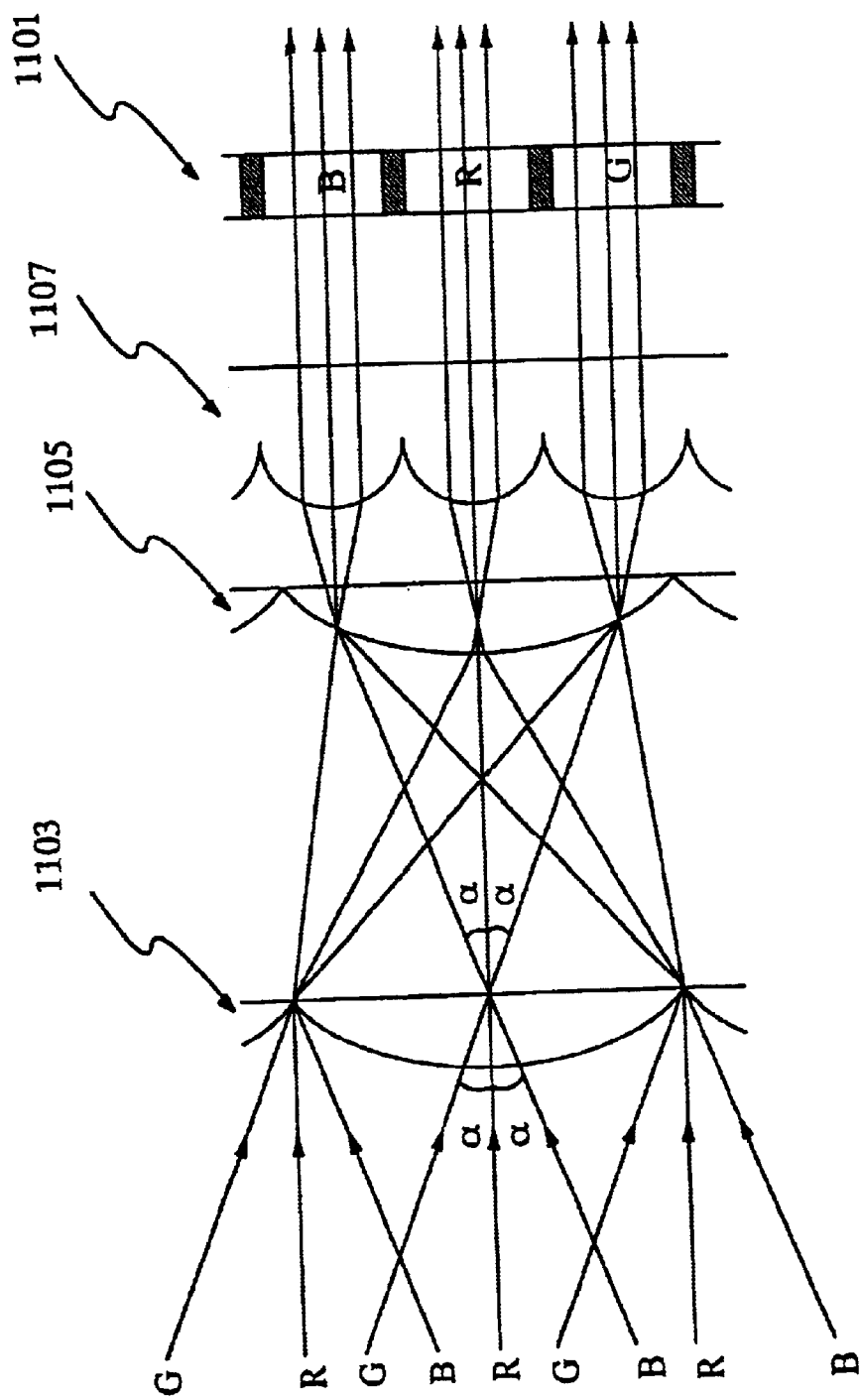
FIG. 12 is a view showing the positional relation between a first lenticular lens, a second lenticular lens, a microlens array, a pixel, and a beam of light passing through a liquid crystal panel in a liquid crystal projector of Embodiment 2 of the present invention.

Next, operations in which light incident on the lenticular lens 1103 passes through the lenticular lens 1105, the microlens array 1107, and the liquid crystal panel 1101, and finally the information of a picture is given, will be described with reference to FIG. 12.

The beams of light of three colors R, G, and B separated by the three dichroic mirrors are incident on the first lenticular lens 1103 at different angles. FIG. 12 shows the corresponding relation between the cylindrical lens and the pixel of the liquid crystal panel 1101. Attention will be paid to the cylindrical lens 1102. It is understood that one cylindrical lens corresponds to a line of three pixels of the liquid crystal panel 1101 corresponding to the three primary colors of R, G, and B.

Next, the beams of light of the colors R, G, and B incident on the first lenticular lens 1103 form light condensing lines, respectively, on the lens surface of the second lenticular lens 1105. The position of the R, G, and B spot beams of light are located on the center lines of the corresponding pixels, their principal rays are bent by the second lenticular lens, and are incident on the third microlens array 1107.

The beams of light of colors R, G, and B incident on the microlens array 1107 composed of the plurality of microlenses are collimated by the microlenses, and are transformed into the beams of light having high parallelity. Thereafter, the beams of light of the colors R, G, and B are incident on the corresponding pixels of the liquid crystal panel 1101, respectively, so that the information of a picture is given.

In this embodiment, the liquid crystal panel 1101 makes display in the ECB mode and a normally black mode is adopted in which black display is made when a voltage is not applied. As described above, the liquid crystal panel making display in the ECB mode uses the phenomenon that when the light travels in the liquid crystal panel, a phase difference occurs by the birefringence of the liquid crystal, so that the polarizing state is changed. Moreover, the phase difference is proportional to the distance which the light travels in the liquid crystal panel. Thus, like this embodiment, when the light incident on the liquid crystal panel is collimated in advance to make the light having high parallelity, the dispersion of distances which the beams of light travel in the liquid crystal panel can be suppressed.

The light having passed through the liquid crystal panel 1101 is then incident on a condensing lens (not shown). The light condensed by the condensing lens is projected on a screen (not shown) by a projection lens (not shown).

As described above, in this embodiment, the white light is separated by arranging the three dichroic mirrors at different angles. Moreover, the beams of light separated by the dichroic mirrors can be made accurately incident on the opening portions of the corresponding pixels by the lenticular lenses 1103 and 1105 and the microlens array 1107. Thus, effective use of light can be realized.

The lenticular lenses 1103 and 1105, and the microlens array 1107 are designed such that light focuses on a desired position, and the arrangement is adjusted.

In this embodiment, with respect to the beams of light of the colors R, G, and B distributed by the lenticular lens 1103, although the principal rays of the beams of light of the respective colors are bent and are made incident vertically on the microlens array 1107, any element may be used as long as similar effect is obtained. For example, a fine trapeziform prism as described in the embodiment 1 may be used.

Embodiment 3

In this embodiment, three kinds of microlenses set forth in the embodiments 1 and 2 and the liquid crystal panel are integrated. Other structural components of the liquid crystal projector are the same as the embodiment 1, their explanation will be omitted.

Figure 13:
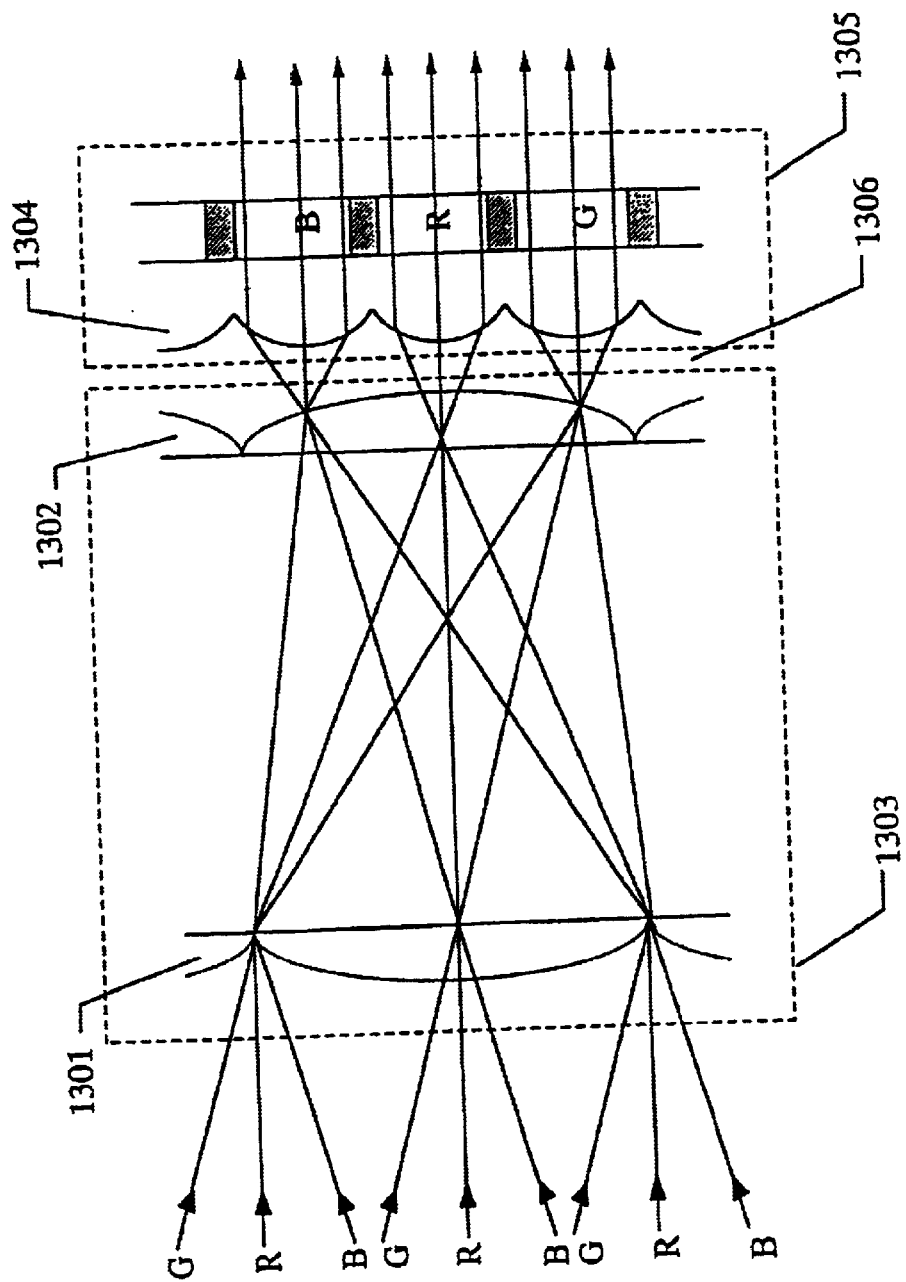
FIG. 13 is a view showing the positional relation among a first microlens, a second microlens, a third microlens, a pixel, and a beam of light passing through a liquid crystal panel in a liquid crystal projector of Embodiment 3 of the present invention.

Reference will be made to FIG. 13. FIG. 13 shows the two lenticular lenses, the microlens array, and the liquid crystal panel of the embodiment 2. In this embodiment, the lenticular lenses 1301 and 1302 are integrally formed to constitute a lenticular lens 1303. The microlens array 1304 and the liquid crystal panel are integrally formed to constitute a liquid crystal panel 1305.

A resin or the like may be injected into a gap 1306 between the lenticular lens 1303 and the liquid crystal panel 1305. The lenticular lens 1303 and the liquid crystal panel 1305 may be fixed by a holder or the like.

When the three beams of light of R, G, and B separated by the three dichroic mirrors are incident on the lenticular lens 1301 at different angles, respectively, the beams of light corresponding to the respective pixels of the liquid crystal panel are emitted from the microlens array 1304. Since the microlens array 1304 is positioned in the vicinity of pixels of the liquid crystal panel, the light flux emitted from the microlens can be certainly made incident on the corresponding pixel opening portion without making the light flux incident on a different color pixel.

In this embodiment, the description has been made with reference to the embodiment 2, also in the embodiment 1, it is needless to say that the microlenses are integrally formed and the gap can be filled with a resin or the like.

Embodiment 4

Figure 14A:
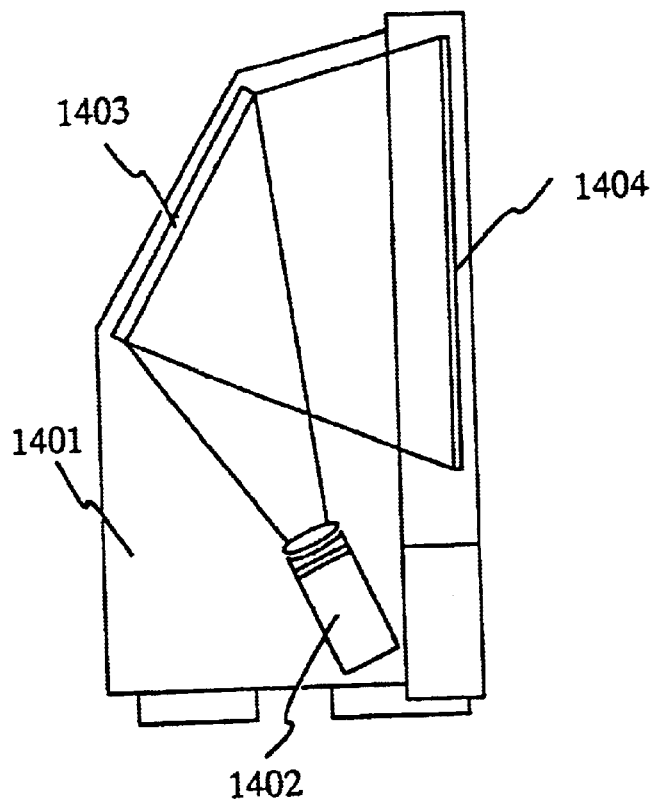
FIGS. 14A and 14B are views showing the structure of a rear type liquid crystal projection TV of Embodiment 4.
Figure 14B:
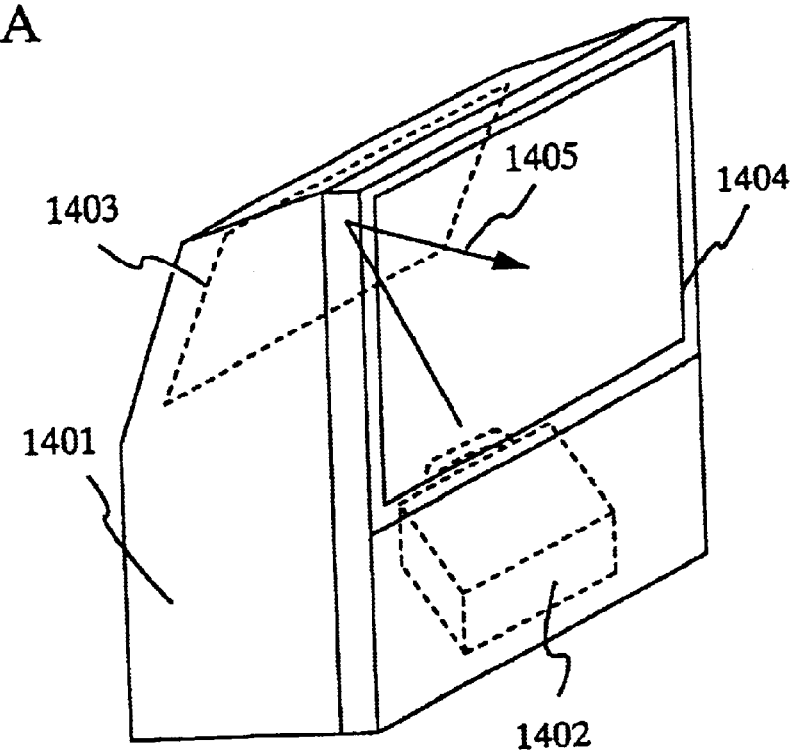

In this embodiment, a projector (projection TV) with a set incorporating an optical engine as shown in the above embodiment 1, 2, or 3 will be described. FIGS. 14A and 14B are views showing the outer appearance of the projection TV of this embodiment. The projection TV of this embodiment is a type generally called a rear type projector. FIG. 14A is a side view schematically showing the inner structure. FIG. 14B is a view showing the projection TV of this embodiment viewed from the oblique direction.

In FIGS. 14A and 14B, reference numeral 1401 denotes a main body, 1402 denotes an optical engine, 1403 denotes a reflector, 1404 denotes a screen, and 1405 denotes a light path. Actually, although other optical systems are added so that the structure becomes complicated, only a schematic structure will be shown in this embodiment.

As the optical engine, a projector of the embodiment 1, 2, or 3 is used.

If a semiconductor circuit is integrally formed in the liquid crystal panel of the embodiment 1, 2, and 3, it is possible to deal with a signal of an NTSC system, a PAL system, or a digital system as well.

Even if video signals correspond to different resolution, such as XGA, SXGA, for UXGA, it is possible to prevent lowering of resolution and to provide a picture having high contrast by means of contrivances of, for example, causing an unnecessary portion (picture non-display portion) to be made black display by a logic circuit and the like.

Embodiment 5

In this embodiment, a projector (projection TV) having a structure different from the embodiment 4 will be described. A device shown in this embodiment is a type generally called a front type projector.

Figure 15:
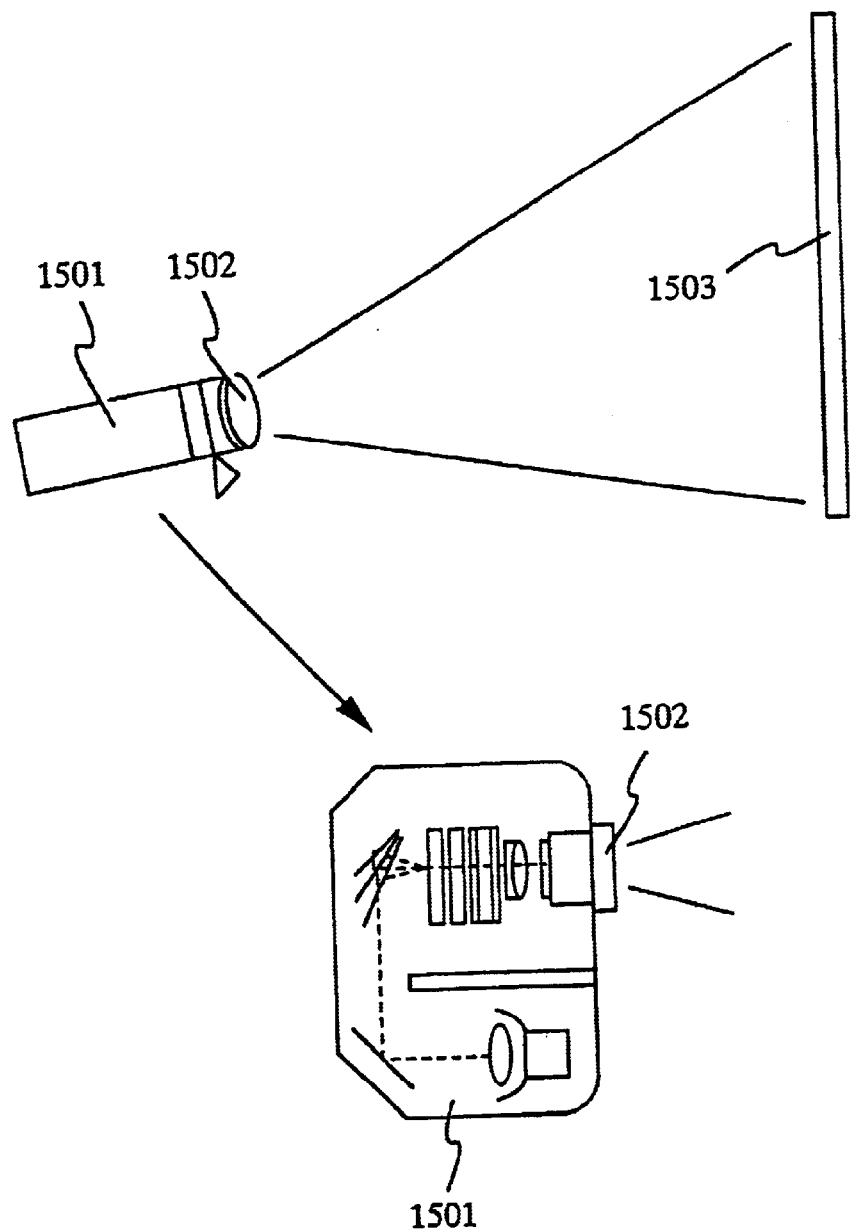
FIG. 15 is a view showing the structure of a front type liquid crystal projection TV of Embodiment 5.
Figure 16:
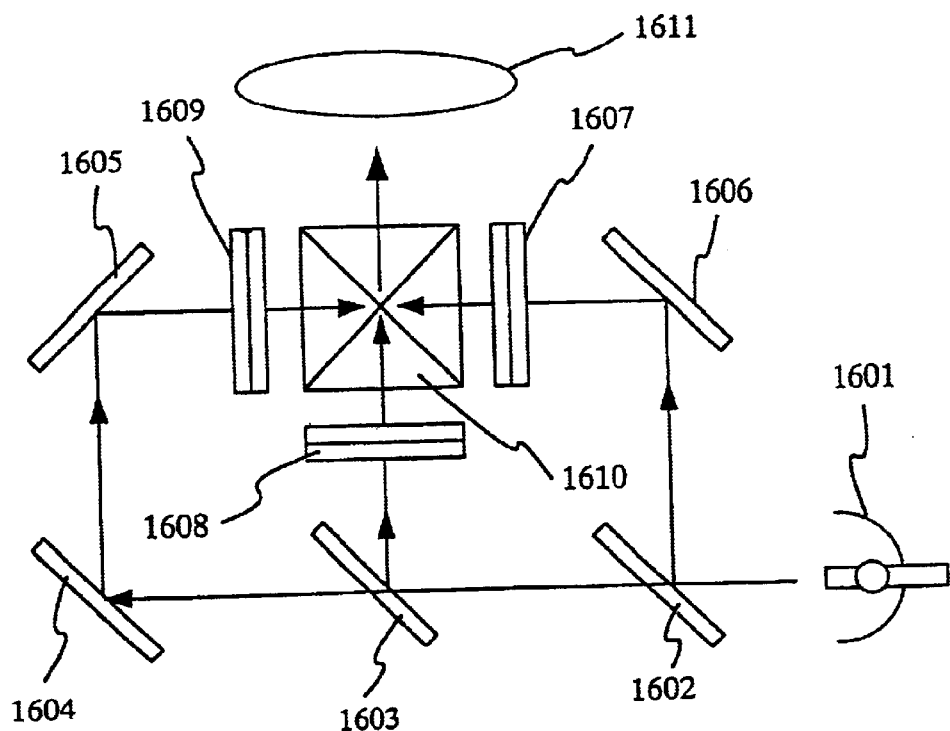
FIG. 16 is a view showing an optical system of a conventional three-plate type liquid crystal projector.
Figure 17:
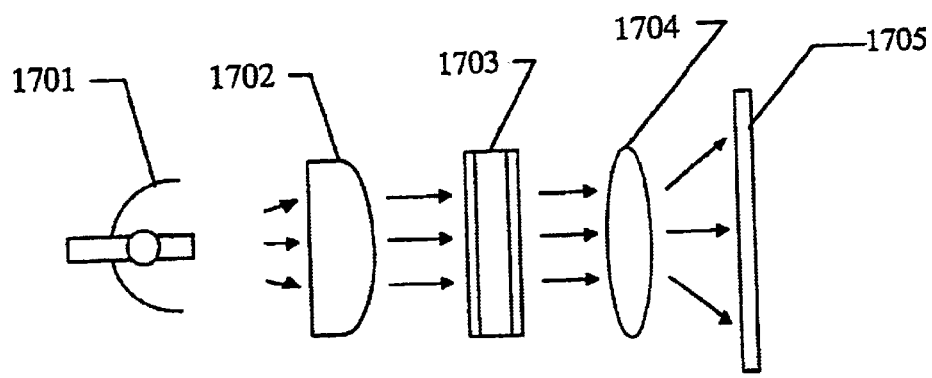
FIG. 17 is a view showing an optical system of a conventional single plate type liquid crystal projector.
Figure 18:
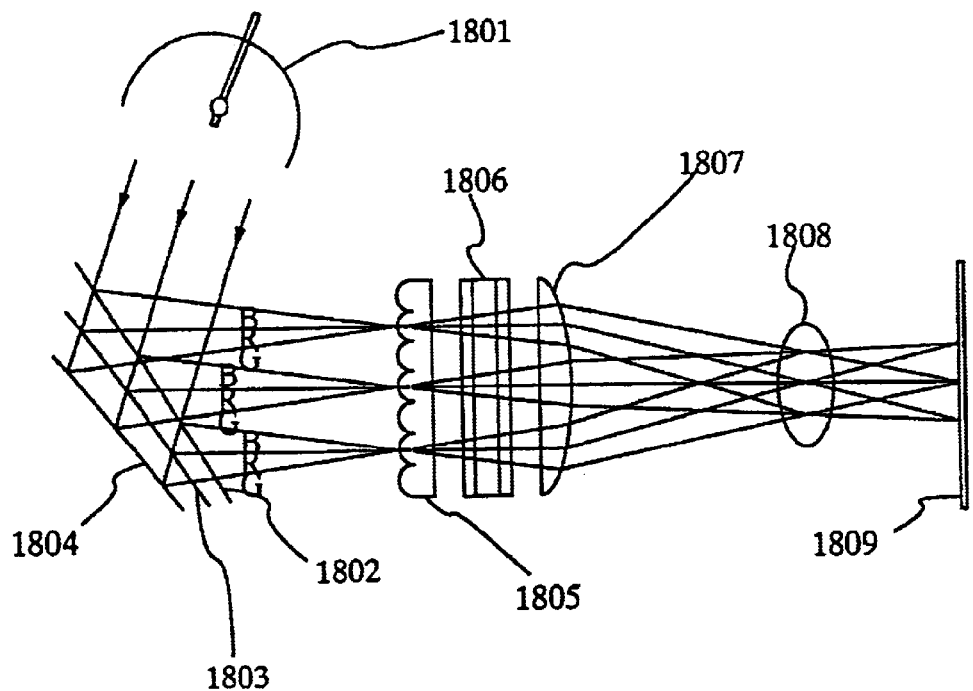
FIG. 18 is a view showing an optical system of a single plate type liquid crystal projector using a conventional microlens.

FIG. 15 is a structural view showing a front type projector of this embodiment. In FIG. 15, 1501 denotes a projection main body, 1502 denotes a projection lens, and 1503 denotes a screen.

The projector shown in the embodiment 1 is used for the projection main body 1501. The light which contains picture information is supplied from the projection main body 1501, and a picture is projected on the screen 1503 by the projection lens.

The most noticeable feature of the front type projector is that a picture is projected on a large picture screen. Thus, the demand as application to a meeting or presentation is high. As the screen, although a screen with a size of 1 to 2.5 m in diagonal is generally often used, a screen having a size larger than that is also used.

In the foregoing embodiments 1 to 5, although the liquid crystal panel making display in the ECB (electric field control birefringence) mode is used, among the ECB modes, a liquid crystal panel making display in an IPS (in-plane switching (horizontal electric field)) mode, or a liquid crystal panel making display in a TN (twisted nematic) or STN (super twisted nematic) mode may be used.

In the foregoing embodiments 1 to 5, although a metal halide lamp is used as a light source, another lamp having a sharp spectrum in red, blue, and green wavelength regions may be used.

According to the liquid crystal projector of the present invention, although the projector is a single plate type liquid crystal projector, effective use of light can be realized. Moreover, the beams of light distributed by the microlenses are transformed into the beams of light having high parallelity before the beams are made incident on the liquid crystal panel, so that the beams can be certainly made incident on the corresponding pixels of the liquid crystal panel. By this, the effective use of the light can be achieved.

Moreover, in the embodiments, the beams of light are condensed by the first microlens array, the principal rays of the beams of light of the respective colors are bent by the second microlens array, the distributed beams of light are collimated by the third microlens array, and the beams of light having high parallelity are made incident on the corresponding pixels of the liquid crystal panel, so that it is possible to suppress the dispersion of distances which the light beams travel in the liquid crystal panel. Thus, even in the case where display is made in the ECB mode, excellent display can be obtained.

Moreover, since the liquid crystal projector of the present invention adopts the normally black mode in the liquid crystal panel, even if a defect occurs in a TFT of the liquid crystal panel, it becomes a black dot and deterioration of picture quality can be prevented.

We claim:

1. A liquid crystal display device comprising:
a first plurality of pixels corresponding to red color being formed over a substrate;
a second plurality of pixels corresponding to green color being formed over the substrate;
a third plurality of pixels corresponding to blue color being formed over the substrate;
a first microlens array including a first plurality of microlenses, said first plurality of microlenses being formed over the first, second and third pluralities of pixels;
a second microlens array including a second plurality of microlenses, said second plurality of microlenses being formed over the first plurality of microlenses;
a third microlens array including a third plurality of microlenses, said third plurality of microlenses being formed over the second plurality of microlenses;
wherein each of the first plurality of microlenses has a smaller size than each of the second and third pluralities of microlenses.

2. A device according to claim 1,
wherein each of the first plurality of microlenses has a hexagon like shape.

3. A device according to claim 1,
wherein each of the first plurality of microlenses has a circular shape.

4. A liquid crystal display device comprising:
a first plurality of pixels corresponding to red color being formed over a substrate;
a second plurality of pixels corresponding to green color being formed over the substrate;
a third plurality of pixels according to blue color being formed over the substrate;
a first microlens array including a first plurality of microlenses, said first plurality of microlenses being formed over the first, second and third pluralities of pixels;
wherein each of the first plurality of microlenses has a same size as each of the first, second and third pluralities of pixels;
a second microlens array including a second plurality of microlenses, said second plurality of microlenses being formed over the first plurality of microlenses;
wherein each of the second plurality of microlenses includes an area equal to three pixels of the first, second and third pluralities of pixels;
a third microlens array including a third plurality of microlenses, said third plurality of microlenses being formed over the second plurality of microlenses;
wherein each of the third plurality of microlenses includes the area equal to three pixels of the first, second and third pluralities of pixels.

5. A device according to claim 4,
wherein each of the first plurality of microlenses has a hexagon like shape.

6. A device according to claim 4,
wherein each of the first plurality of microlenses has a circular shape.

7. A liquid crystal display device comprising:
a first plurality of pixels corresponding to red color being formed over a substrate;
a second plurality of pixels corresponding to green color being formed over the substrate;

a third plurality of pixels corresponding to blue color being formed over the substrate;

a first microlens array including a first plurality of microlenses, said first plurality of microlenses being formed over the first, second and third pluralities of pixels;

a plurality of trapeziform prisms being formed over the first plurality of microlenses;

a second microlens array including a second plurality of microlenses, said second plurality of microlenses being formed over the plurality of trapeziform prisms, wherein each of the first plurality of microlenses has a smaller size than each of the plurality of trapeziform prisms or each of the second plurality of microlenses.

8. A device according to claim 7, wherein each of the first plurality of microlenses has a hexagon like shape.

9. A device according to claim 7, wherein each of the first plurality of microlenses has a circular shape.

10. A liquid crystal display device comprising:

a first plurality of pixels corresponding to red color being formed over a substrate;

a second plurality of pixels corresponding to green color being formed over the substrate;

a third plurality of pixels corresponding to blue color being formed over the substrate;

a first microlens array including a first plurality of microlenses, said first plurality of microlenses being formed over the first, second and third pluralities of pixels;

wherein each of the first plurality of microlenses has a same size as each of the first, second and third pluralities of pixels;

a plurality of trapeziform prisms, said plurality of trapeziform prisms being formed over the first plurality of microlenses;

wherein each of the plurality of trapeziform prisms includes an area equal to three pixels of the first, second and third pluralities of pixels;

a second microlens array including a second plurality of microlenses, said second plurality of microlenses being formed over the plurality of trapeziform prisms;

wherein each of the second plurality of microlenses includes the area equal to three pixels of the first, second and third pluralities of pixels.

11. A device according to claim 10, wherein each of the first plurality of microlenses has a hexagon like shape.

12. A device according to claim 10, wherein each of the first plurality of microlenses has a circular shape.

13. A liquid crystal display device comprising:

a plurality of pixels being arranged in a matrix form over a substrate;

a first microlens array including a first plurality of microlenses, said first plurality of microlenses being formed over the plurality of pixels;

a second microlens array including a second plurality of microlenses, said second plurality of microlenses being disposed adjacent to the first plurality of microlenses;

wherein the second plurality of microlenses are arranged only in one of column or row direction of the form while the first plurality of microlenses are arranged in both the column and row directions.

14. A device according to claim 13, wherein the liquid crystal display device is operated in a normally black mode.

15. A device according to claim 13, wherein the plurality of pixels are arranged in a stripe arrangement.

16. A liquid crystal display device comprising:

a plurality of pixels being formed over a substrate;

a first microlens array including a first plurality of microlenses, said first plurality of microlenses being formed over the plurality of pixels;

a second microlens array including a second plurality of microlenses, and a third microlens array including a third plurality of microlenses, said second and third microlens arrays being formed over the first microlens array; and a light source, wherein the second microlens array or the third microlens array is a lenticular lens, and wherein the first microlens array, the second microlens array and the third microlens array are located between the plurality of pixels and the light source.

17. A device according to claim 16, wherein each of the second and third pluralities of microlenses is a cylindrical lens.

18. A device according to claim 17, wherein the cylindrical lens corresponds to a line of three pixels among the plurality of pixels corresponding to three primary colors of red, green and blue.

19. A device according to claim 16, wherein the liquid crystal display device is operated in a normally black mode.

20. A device according to claim 16, wherein the plurality of pixels are arranged in a stripe arrangement.

21. A liquid crystal display device comprising:

a plurality of pixels being formed over a substrate;

a first microlens array including a first plurality of microlenses, said first plurality of microlenses being formed over the plurality of pixels;

a second microlens array and a third microlens array being integrally combined, said second and third microlens array being formed over the first microlens array; and a light source, wherein each of the second and third microlens arrays is a lenticular lens, and wherein the first microlens array, the second microlens array and the third microlens array are located between the plurality of pixels and the light source.

22. A device according to claim 21, wherein the lenticular lens includes a plurality of cylindrical lenses.

23. A device according to claim 22, wherein the cylindrical lens corresponds to a line of three pixels among the plurality of pixels corresponding to three primary colors of red, green and blue.

24. A device according to claim 21, wherein the liquid crystal display device is operated in a normally black mode.

25. A device according to claim 21, wherein the plurality of pixels are arranged in a stripe arrangement.

26. A liquid crystal display device according to claim 1, wherein a light is parallelized by the first microlens array, the second microlens array and the third microlens array, and entered into the first plurality of pixels, the second plurality of pixels and the third plurality of pixels.

27. A liquid crystal display device according to claim 4, wherein a light is parallelized by the first microlens array, the second microlens array and the third microlens array, and entered into the first plurality of pixels, the second plurality of pixels and the third plurality of pixels.

28. A liquid crystal display device according to claim 7, wherein a light is parallelized by the first microlens array, the plurality of trapeziform prisms and the second microlens array, and entered into the first plurality of pixels, the second plurality of pixels and the third plurality of pixels.

29. A liquid crystal display device according to claim 10, wherein a light is parallelized by the first microlens array, the plurality of trapeziform prisms and the second microlens array, and entered into the first plurality of pixels, the second plurality of pixels and the third plurality of pixels.

30. A liquid crystal display device according to claim 13, wherein a light is parallelized by the first microlens array and the second microlens array, and entered into the plurality of pixels.

31. A liquid crystal display device according to claim 16, wherein a light from the light source is parallelized by the first microlens array, the second microlens array and the third microlens array, and entered into the plurality of pixels.

32. A liquid crystal display device according to claim 21, wherein a light from the light source is parallelized by the first microlens array, the second microlens array and the third microlens array, and entered into the plurality of pixels.

* * * * *